US007880917B2

(12) United States Patent
Yamamoto

(10) Patent No.: US 7,880,917 B2
(45) Date of Patent: Feb. 1, 2011

(54) IMAGE FORMING APPARATUS AND PRINT SYSTEM

(75) Inventor: Kazuya Yamamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1144 days.

(21) Appl. No.: 10/996,954

(22) Filed: Nov. 24, 2004

(65) Prior Publication Data
US 2005/0141032 A1 Jun. 30, 2005

(30) Foreign Application Priority Data
Nov. 25, 2003 (JP) ............................. 2003-393778

(51) Int. Cl.
G06F 15/00 (2006.01)
(52) U.S. Cl. ...................... 358/1.17; 358/1.2; 358/1.15; 358/1.16
(58) Field of Classification Search ................ 358/1.17, 358/1.2, 1.15, 1.16
See application file for complete search history.

(56) References Cited

U.S. PATENT DOCUMENTS

| 5,654,804 A * | 8/1997 | Hattori ........................ 358/404 |
| 6,549,947 B1 * | 4/2003 | Suzuki ........................ 709/229 |
| 6,665,088 B1 * | 12/2003 | Chiba et al. ................. 358/1.17 |
| 7,221,466 B2 * | 5/2007 | Ishii et al. ................... 358/1.15 |
| 7,443,519 B1 * | 10/2008 | Kakuno ....................... 358/1.13 |
| 2004/0153766 A1 * | 8/2004 | Yamamoto et al. ............ 714/18 |

FOREIGN PATENT DOCUMENTS

| JP | 09-237168 A | 9/1997 |
| JP | 2001260493 A | 9/2001 |

* cited by examiner

Primary Examiner—Edward L. Coles
Assistant Examiner—Mark R Milia
(74) Attorney, Agent, or Firm—Panitch Schwarze Belisario & Nadel LLP

(57) ABSTRACT

When a jam occurs, a CPU stops reading of compression data, receives again all of the read-out compression data of a page to which the reading-stopped compression data belongs, and stores it into each of corresponding storing areas in a reception buffer again. A time necessary for communication between a host and a printer at the time of jam recovery can be shortened.

8 Claims, 31 Drawing Sheets

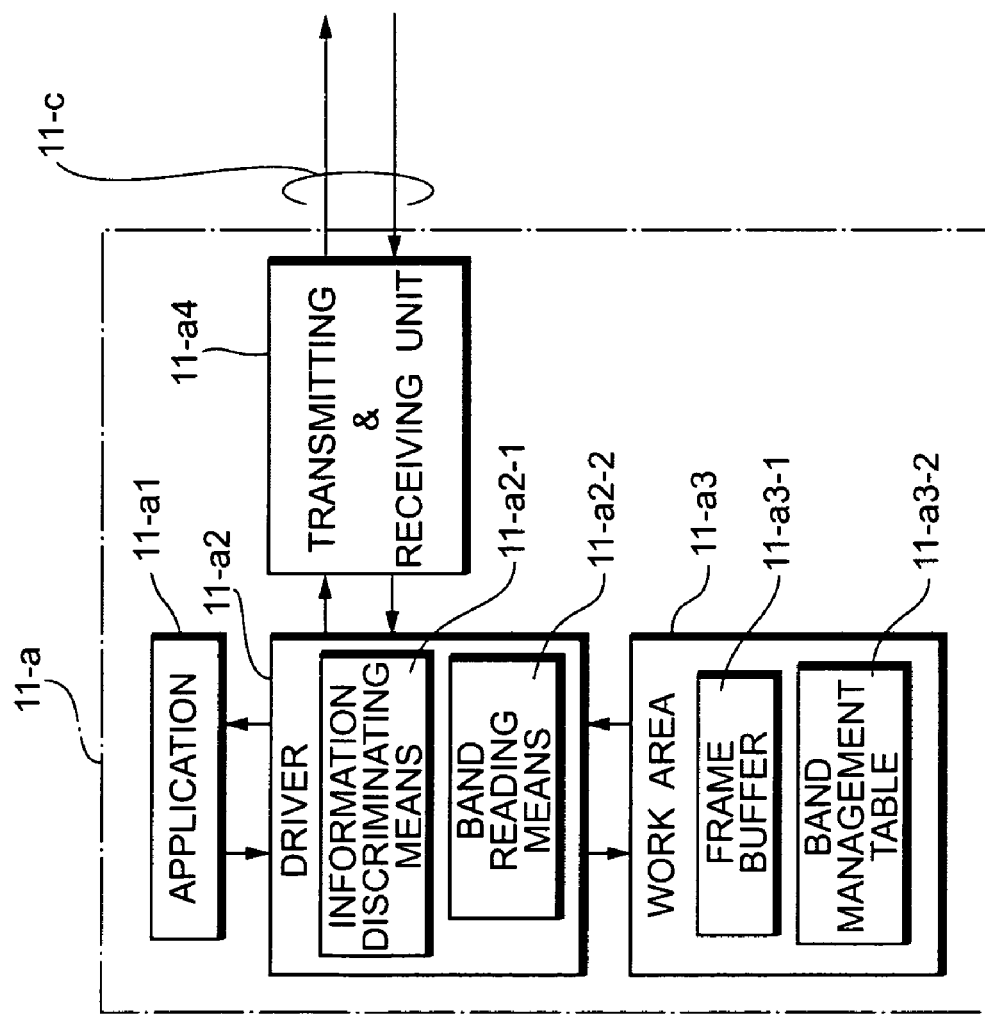

<EXAMPLE OF CONTENTS OF BAND MANAGEMENT TABLE>

| PAGE NUMBER | BAND NUMBER | START ADDRESS | DATA SIZE |
|---|---|---|---|
| 1 | 1 | 0000_0000 | 0000_1000 |
| 1 | 2 | 0001_0000 | 0000_2000 |
| 1 | 3 | 0002_0000 | 0000_3000 |
| ⋮ | ⋮ | ⋮ | ⋮ |
| 2 | 1 | 0010_0000 | 0000_3000 |
| 2 | 2 | 0011_0000 | 0000_2000 |
| 2 | 3 | 0012_0000 | 0000_1000 |
| ⋮ | ⋮ | ⋮ | ⋮ |

Fig.5

<DETAILED EXAMPLE OF EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_0000 | 0000_2000 | 1 | 1 |
| 1 | 2 | 0000_1000 | 0000_2000 | 1 | 0 |
| 1 | 3 | 0000_2000 | 0000_2000 | 0 | 0 |
| ------ | ------ | ------ | ------ | ------ | ------ |
| 1 | n | 0000_F000 | 0000_2000 | 0 | 0 |

Fig. 9

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| 0 | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |

(a) INITIAL STATE

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |

(b) RECEPTION OF PAGE INFORMATION OF THE 1ST PAGE

Fig. 10

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_a000 | 0 | 0 |
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |
| 0 | 0 | 0000_0000 | 0000_0000 | 0 | 0 |

(c) RECEPTION OF BAND 1 OF THE 1ST PAGE

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_0a00 | 0 | 0 |
| 1 | 2 | 0000_2000 | 0000_0b00 | 0 | 0 |
| 1 | 3 | 0000_3000 | 0000_0c00 | 0 | 0 |
| 0 | 0 | 0000_0000 | 0000_0000 | 0 | 0 |
| 0 | 0 | 0000_0000 | 0000_0000 | 0 | 0 |

(d) RECEPTION OF UP TO BAND 3 OF THE 1ST PAGE

Fig.11

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_0a00 | 0 | 0 |
| 1 | 2 | 0000_2000 | 0000_0b00 | 0 | 0 |
| 1 | 3 | 0000_3000 | 0000_0c00 | 0 | 0 |
| 1 | 4 | 0000_4000 | 0000_0d00 | 0 | 0 |
| 1 | 5 | 0000_5000 | 0000_0e00 | 0 | 0 |

(e) COMPLETION OF RECEPTION OF THE 1ST PAGE

Fig.13

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_0a00 | 0 | 0 |
| 1 | 2 | 0000_2000 | 0000_0b00 | 0 | 0 |
| 1 | 3 | 0000_3000 | 0000_0c00 | 0 | 0 |
| 1 | 4 | 0000_4000 | 0000_0d00 | 0 | 0 |
| 1 | 5 | 0000_5000 | 0000_0e00 | 0 | 0 |

(a) AT THE START OF PRINTING

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | 0 |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_0a00 | 1 | 1 |
| 1 | 2 | 0000_2000 | 0000_0b00 | 0 | 0 |
| 1 | 3 | 0000_3000 | 0000_0c00 | 0 | 0 |
| 1 | 4 | 0000_4000 | 0000_0d00 | 0 | 0 |
| 1 | 5 | 0000_5000 | 0000_0e00 | 0 | 0 |

(b) STORING AREA OF BAND 1 HAS BEEN OPENED

Fig. 14

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 2 | 1 | 0000_1000 | 0000_0f00 | 0 | 0 |
| 1 | 2 | 0000_2000 | 0000_0b00 | 1 | 1 |
| 1 | 3 | 0000_3000 | 0000_0c00 | 0 | 0 |
| 1 | 4 | 0000_4000 | 0000_0d00 | 0 | 0 |
| 1 | 5 | 0000_5000 | 0000_0e00 | 0 | 0 |

(c) STORING AREA OF BAND 2 HAS BEEN OPENED

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 2 | 1 | 0000_1000 | 0000_0f00 | 0 | 0 |
| 2 | 2 | 0000_2000 | 0000_0900 | 0 | 0 |
| 1 | 3 | 0000_3000 | 0000_0c00 | 1 | 1 |
| 1 | 4 | 0000_4000 | 0000_0d00 | 0 | 0 |
| 1 | 5 | 0000_5000 | 0000_0e00 | 0 | 0 |

(d) STORING AREA OF BAND 3 HAS BEEN OPENED

Fig. 15

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 2 | 1 | 0000_1000 | 0000_0f00 | 0 | 0 |
| 2 | 2 | 0000_2000 | 0000_0900 | 0 | 0 |
| 2 | 3 | 0000_3000 | 0000_0800 | 0 | 0 |
| 1 | 4 | 0000_4000 | 0000_0d00 | 1 | 1 |
| 1 | 5 | 0000_5000 | 0000_0e00 | 0 | 0 |

(e) STORING AREA OF BAND 4 HAS BEEN OPENED

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 2 | 1 | 0000_1000 | 0000_0f00 | 0 | 0 |
| 2 | 2 | 0000_2000 | 0000_0900 | 0 | 0 |
| 2 | 3 | 0000_3000 | 0000_0800 | 0 | 0 |
| 2 | 4 | 0000_4000 | 0000_0700 | 0 | 0 |
| 1 | 5 | 0000_5000 | 0000_0e00 | 1 | 1 |

(f) STORING AREA OF BAND 5 HAS BEEN OPENED

Fig.16

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| OPEN | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 2 | 1 | 0000_1000 | 0000_0f00 | 0 | 0 |
| 2 | 2 | 0000_2000 | 0000_0900 | 0 | 0 |
| 2 | 3 | 0000_3000 | 0000_0800 | 0 | 0 |
| 2 | 4 | 0000_4000 | 0000_0700 | 0 | 0 |
| 2 | 5 | 0000_5000 | 0000_0600 | 0 | 0 |

(g) THE 1ST PAGE HAS BEEN PRINTED

Fig. 17

| BAND 1 | BAND 1 OF THE 1ST PAGE |
|---|---|
| BAND 2 | BAND 2 OF THE 1ST PAGE |
| BAND 3 | BAND 3 OF THE 1ST PAGE |
| BAND 4 | BAND 4 OF THE 1ST PAGE |
| BAND 5 | BAND 5 OF THE 1ST PAGE |

(a) AT THE START OF PRINTING

| BAND 1 | OPEN |
|---|---|
| BAND 2 | BAND 2 OF THE 1ST PAGE |
| BAND 3 | BAND 3 OF THE 1ST PAGE |
| BAND 4 | BAND 4 OF THE 1ST PAGE |
| BAND 5 | BAND 5 OF THE 1ST PAGE |

(b) MEMORY OF STORING AREA OF BAND 1 HAS BEEN OPENED

| BAND 1 | BAND 1 OF THE 2ND PAGE |
|---|---|
| BAND 2 | OPEN |
| BAND 3 | BAND 3 OF THE 1ST PAGE |
| BAND 4 | BAND 4 OF THE 1ST PAGE |
| BAND 5 | BAND 5 OF THE 1ST PAGE |

(c) MEMORY OF STORING AREA OF BAND 2 HAS BEEN OPENED

| BAND 1 | BAND 1 OF THE 2ND PAGE |
|---|---|
| BAND 2 | BAND 2 OF THE 2ND PAGE |
| BAND 3 | OPEN |
| BAND 4 | BAND 4 OF THE 1ST PAGE |
| BAND 5 | BAND 5 OF THE 1ST PAGE |

(d) MEMORY OF STORING AREA OF BAND 3 HAS BEEN OPENED

| BAND 1 | BAND 1 OF THE 2ND PAGE |
|---|---|
| BAND 2 | BAND 2 OF THE 2ND PAGE |
| BAND 3 | BAND 3 OF THE 2ND PAGE |
| BAND 4 | OPEN |
| BAND 5 | BAND 5 OF THE 1ST PAGE |

(e) MEMORY OF STORING AREA OF BAND 4 HAS BEEN OPENED

| BAND 1 | BAND 1 OF THE 2ND PAGE |
|---|---|
| BAND 2 | BAND 2 OF THE 2ND PAGE |
| BAND 3 | BAND 3 OF THE 2ND PAGE |
| BAND 4 | BAND 4 OF THE 2ND PAGE |
| BAND 5 | OPEN |

(f) MEMORY OF STORING AREA OF BAND 5 HAS BEEN OPENED

| BAND 1 | BAND 1 OF THE 2ND PAGE |
|---|---|
| BAND 2 | BAND 2 OF THE 2ND PAGE |
| BAND 3 | BAND 3 OF THE 2ND PAGE |
| BAND 4 | BAND 4 OF THE 2ND PAGE |
| BAND 5 | BAND 5 OF THE 2ND PAGE |

(g) THE 1ST PAGE HAS BEEN PRINTED

Fig. 18

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 2 | 1 | 0000_1000 | 0000_0f00 | 0 | 0 |
| 1 | 2 | 0000_2000 | 0000_0b00 | 1 | 1 |
| 1 | 3 | 0000_3000 | 0000_0c00 | 1 | 0 |
| 1 | 4 | 0000_4000 | 0000_0d00 | 0 | 0 |
| 1 | 5 | 0000_5000 | 0000_0e00 | 0 | 0 |

(a) STATE OF MEMORY MANAGEMENT TABLE

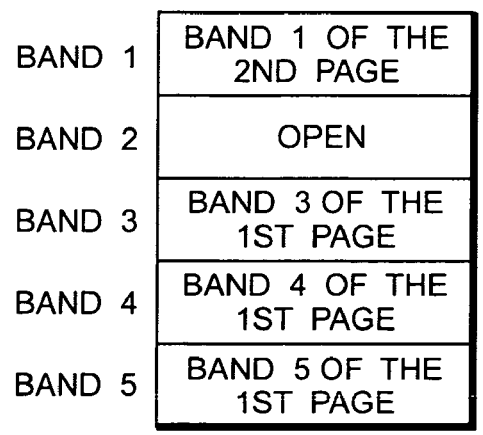

| BAND 1 | BAND 1 OF THE 2ND PAGE |
| BAND 2 | OPEN |
| BAND 3 | BAND 3 OF THE 1ST PAGE |
| BAND 4 | BAND 4 OF THE 1ST PAGE |
| BAND 5 | BAND 5 OF THE 1ST PAGE |

(b) STATE OF RECEPTION BUFFER

Fig. 19

| <VARIOUS INFORMATION PORTION OF PRINT PAGE> ||
|---|---|
| VARIOUS INFORMATION PORTION (1) OF PAGE | VARIOUS INFORMATION PORTION (2) OF PAGE |
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_0a00 | 0 | 0 |
| 1 | 2 | 0000_2000 | 0000_0b00 | 1 | 1 |
| 1 | 3 | 0000_3000 | 0000_0c00 | 1 | 0 |
| 1 | 4 | 0000_4000 | 0000_0d00 | 0 | 0 |
| 1 | 5 | 0000_5000 | 0000_0e00 | 0 | 0 |

(a) STATE OF MEMORY MANAGEMENT TABLE

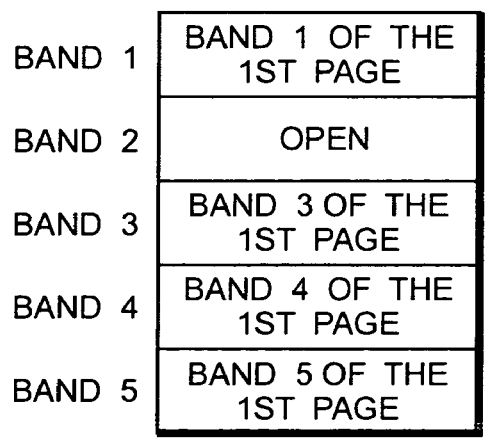

| | |
|---|---|
| BAND 1 | BAND 1 OF THE 1ST PAGE |
| BAND 2 | OPEN |
| BAND 3 | BAND 3 OF THE 1ST PAGE |
| BAND 4 | BAND 4 OF THE 1ST PAGE |
| BAND 5 | BAND 5 OF THE 1ST PAGE |

(b) STATE OF RECEPTION BUFFER

Fig.20

<VARIOUS INFORMATION PORTION OF PRINT PAGE>

| VARIOUS INFORMATION PORTION (1) OF PAGE | VARIOUS INFORMATION PORTION (2) OF PAGE |
|---|---|
| PAGE INFORMATION OF THE 1ST PAGE | PAGE INFORMATION OF THE 2ND PAGE |

<EACH BAND INFORMATION PORTION>

| PAGE NUMBER | BAND NUMBER | START ADDRESS | DATA SIZE | READING STATE | MEMORY OPENING STATE |
|---|---|---|---|---|---|
| 1 | 1 | 0000_1000 | 0000_0a00 | 0 | 0 |
| 1 | 2 | 0000_2000 | 0000_0b00 | 0 | 0 |
| 1 | 3 | 0000_3000 | 0000_0c00 | 0 | 0 |
| 1 | 4 | 0000_4000 | 0000_0d00 | 0 | 0 |
| 1 | 5 | 0000_5000 | 0000_0e00 | 0 | 0 |

(a) STATE OF MEMORY MANAGEMENT TABLE

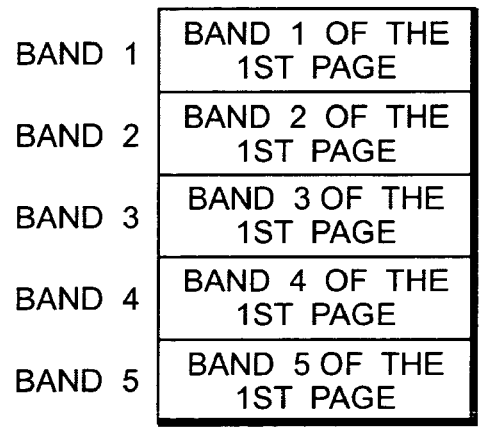

(b) STATE OF RECEPTION BUFFER

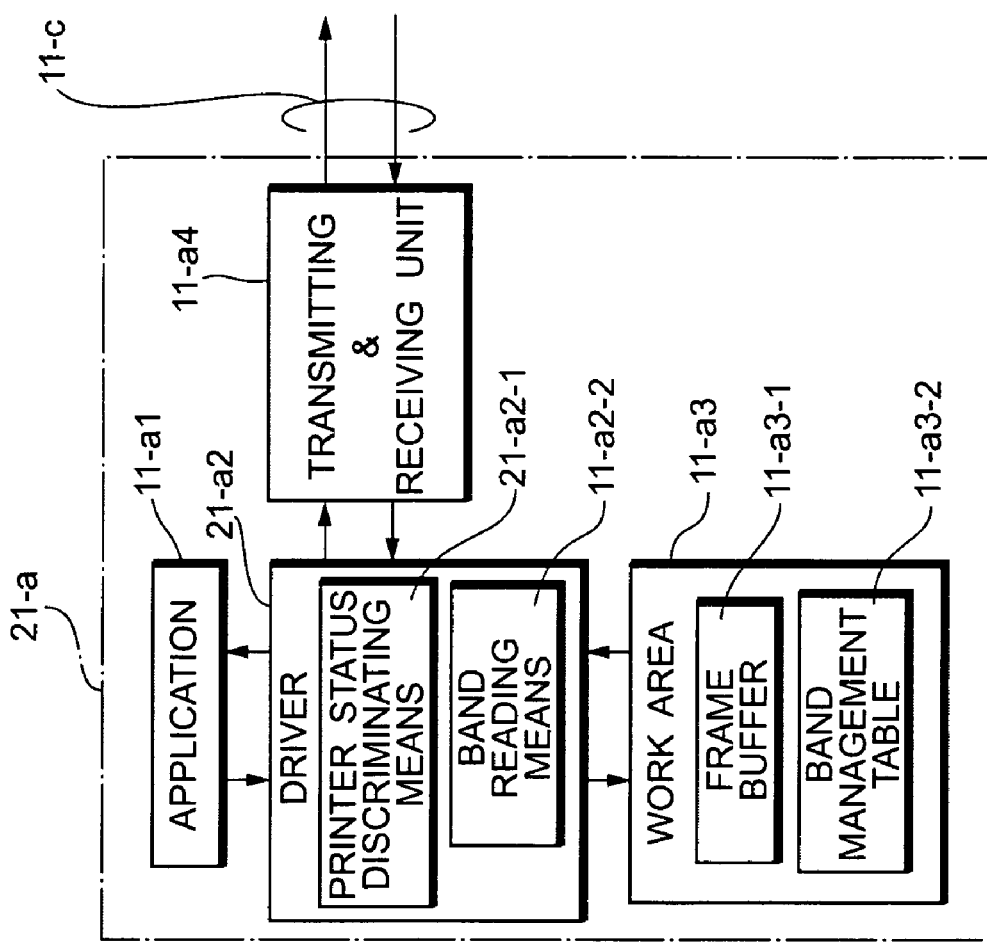

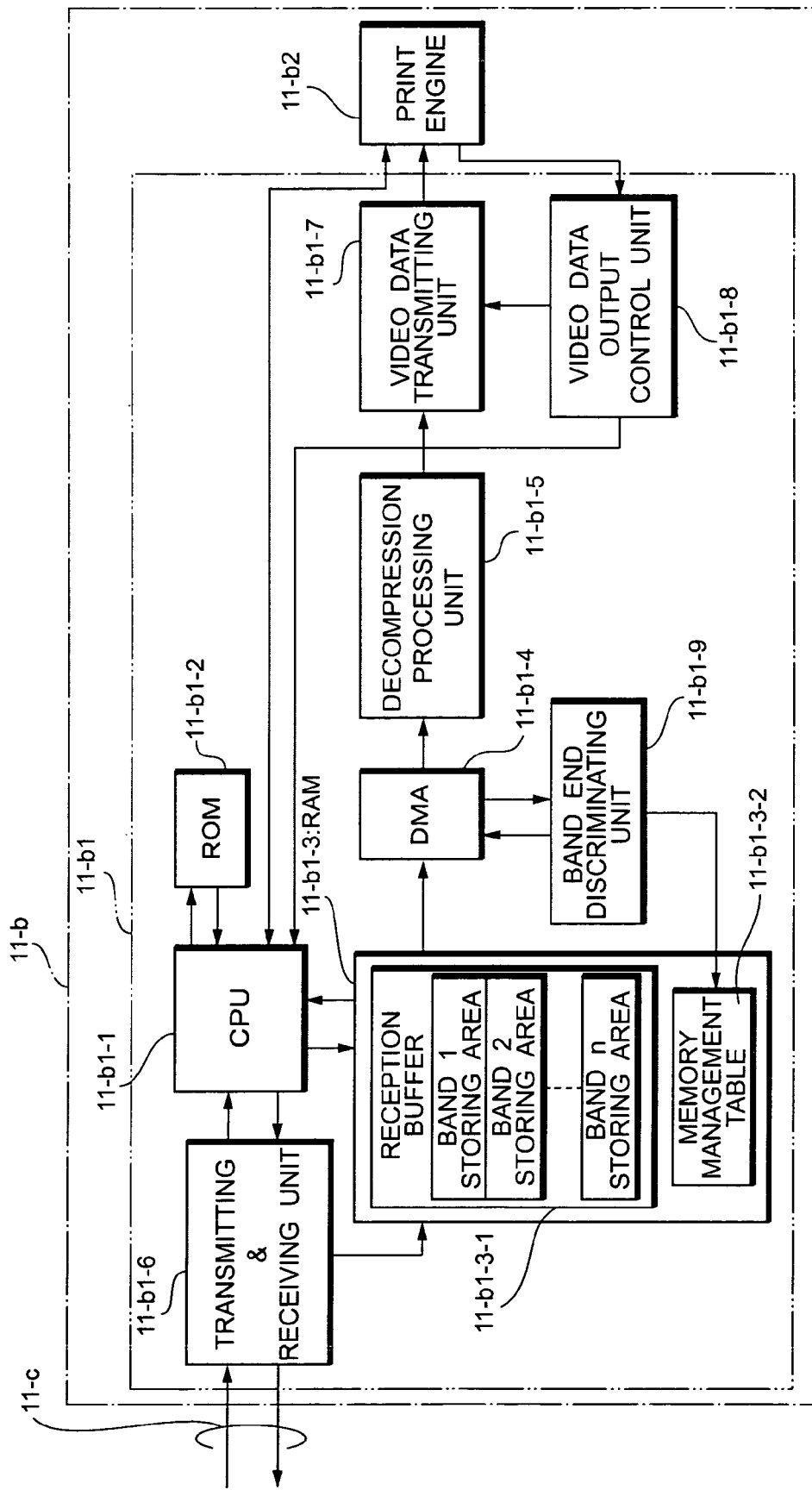

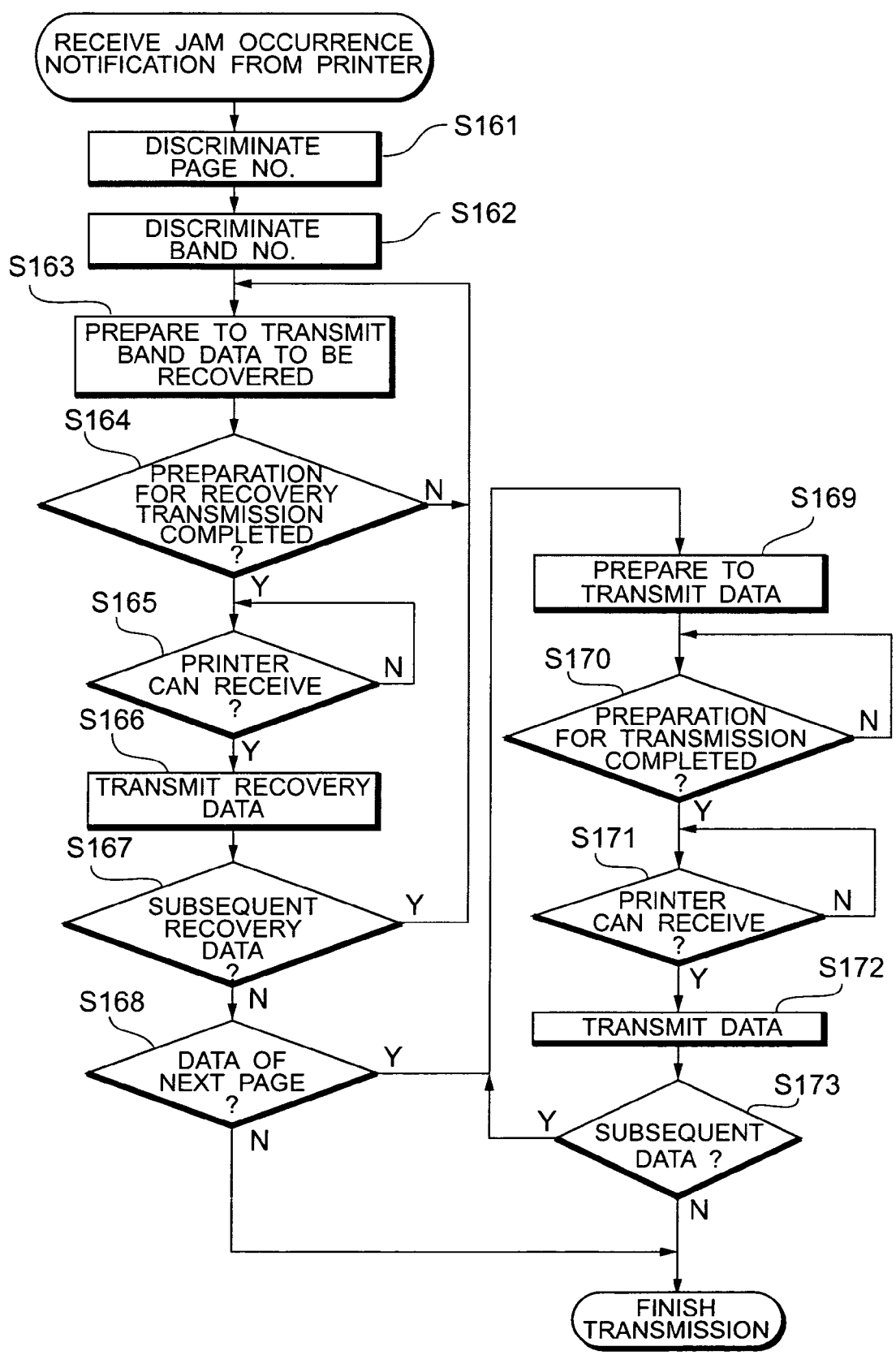

IMAGE FORMING APPARATUS AND PRINT SYSTEM

BACKGROUND OF THE INVENTION

1. Field of the Invention

The invention relates to an image forming apparatus such as a host-based printer apparatus or the like and a print system having the image forming apparatus.

2. Related Background Art

In a printer or the like for printing image data of a plurality of pages, a memory of a large capacity is provided on the printer side and image information of a plurality of pages received from a host is stored once into the memory of the large capacity. After that, the image information stored once in the memory is converted into image data such as bit map data or the like and printed on the printer side. However, among low-priced printers or the like, there is also a printer having a memory of a capacity of only one page. In such a printer, the image information of the plurality of pages is converted into image data and compressed on the host side and sent to the printer. The printer receives the image data and prints. Such a printer is called a host-based printer.

In the conventional host-based printer, if a jam occurs during the printing, the host is notified of it. When the host receives such a notification, it automatically transmits the image data of the relevant page again. At the same time, the printer clears all image data of the relevant page remaining on the printer side. Therefore, even if the printer does not have the memory of the large capacity, the page in which the jam occurred during the printing can be reproduced (for example, refer to JP-A-9-237168).

Since the memory (reception buffer) of the capacity of only one page is provided for the conventional host-based printer, presumption of the occurrence of the jam makes it necessary to hold all compression data of the page which is at present being printed into the reception buffer for the jam recovery until the completion of the printing of the page which is at present being printed. Thus, the compression data of the next page is received after completion of the printing of all of the compression data of the page. Consequently, it takes a long time until the printing of the next page is started after the printing of the page which is at present being printed is completed.

SUMMARY OF THE INVENTION

It is, therefore, an object of the invention to provide an image forming apparatus such as a host-based printer apparatus or the like which can shorten a time that is required until the printing of the next page is started after the printing of a page which is at present being printed is completed and to provide a print system having such an image forming apparatus.

According to the present invention, there is provided an image forming apparatus comprising:

a reception buffer for storing a plurality of band data that are obtained by dividing image data of one page into bands;

a printing section which sequentially reads out the band data stored in the reception buffer, and with respect to each band data read out, performs the corresponding printing process and sends a readout end notice;

a memory managing section which, on the basis of the readout end notice sent from the printing section, manages state information with respect to each band data; and a control section for controlling transmission and reception of each band data, wherein the control section, when a jam occurs, makes the printing section stop the printing process and sends a re-transmitting request with respect to the band data whose corresponding process has been finished on the basis of the state information managed by the memory managing section.

In the image forming apparatus, the state information includes information indicating whether the corresponding readout has been finished, and information indicating the corresponding band data has been deleted.

Further, in the image forming apparatus, the finished process means the corresponding band data has been deleted.

According to the present invention, there is also provided a printing system comprising:

an image forming apparatus described above; and a host apparatus which has a storing buffer for storing the plurality of band data that are obtained by dividing image data of one page into bands; and a transmitting section which, when received the re-transmitting request from the image forming apparatus, transmits the corresponding band data to the image forming apparatus according to the re-transmitting request.

Further, according to the present invention, there is also provided a printing system comprising:

the image forming apparatus described above; and a host apparatus which has a storing buffer for storing the plurality of band data that are obtained by dividing image data of one page into bands; and a receiving and transmitting section which, when received a jam occurring notice and the state information of each band data sent from the image forming apparatus, transmits the corresponding band data that are stored in the storing buffer and are judged needing to re-transmitted, to the image forming apparatus on the basis of the state information.

Since it is possible to stop jam recovery on a page unit basis and execute the jam recovery on a band unit basis, it is unnecessary to hold all of the compression data of the page which is at present being printed into the reception buffer for the jam recovery until the completion of the printing of the page which is at present being printed. There is, consequently, such an effect that the time that is required until the printing of the next page is started after the printing of the page which is at present being printed is completed can be shortened.

The above and other objects and features of the present invention will become apparent from the following detailed description and the appended claims with reference to the accompanying drawings.

BRIEF DESCRIPTION OF THE DRAWINGS

FIG. 5 is a diagram showing an example of the memory management table;

FIG. 9 is an explanatory diagram (part 1) of a state change of the memory management table until reception is completed after it is started;

FIG. 10 is an explanatory diagram (part 2) of the state change of the memory management table until the reception is completed after it is started;

FIG. 11 is an explanatory diagram (part 3) of the state change of the memory management table until the reception is completed after it is started;

FIG. 13 is an explanatory diagram (part 1) of the state change of the memory management table until the printing is completed after it is started;

FIG. 14 is an explanatory diagram (part 2) of the state change of the memory management table until the printing is completed after it is started;

FIG. 15 is an explanatory diagram (part 3) of the state change of the memory management table until the printing is completed after it is started;

FIG. 16 is an explanatory diagram (part 4) of the state change of the memory management table until the printing is completed after it is started;

FIG. 17 is an explanatory diagram of the state change of the reception buffer until the printing is completed after it is started;

FIG. 18 is an explanatory diagram of a state of the occurrence of a jam on the way of a band 3;

FIG. 19 is an explanatory diagram of the state where a band 1 has been received again;

FIG. 20 is an explanatory diagram of the state where data of up to a band 2 has been received again;

FIG. 24 is a block diagram showing a construction of an embodiment 2;

FIG. 30 is a flowchart for the operation of the host at the time of jam recovery in the embodiment 2.

DETAILED DESCRIPTION OF THE PREFERRED EMBODIMENTS

Conversion and compression of image information into image data are processed on a band unit basis and each time the band compression data is read out from a reception buffer provided for a printer, the band compression data of the corresponding next page is sequentially stored into an opened memory. When a jam occurs, jam recovery to be executed on a page unit basis is stopped and executed on a band unit basis. That is, it is assumed that when the jam occurs, the printer receives again only the compression data which has so far been read out from the reception buffer, stores it again, and holds the subsequent compression data as it is without abandoning it.

Embodiment 1

Embodiments of the invention will now be described hereinbelow with reference to the drawings. Explanation will be made here by limiting an image forming apparatus to a host-based printer.

Figure 1B:
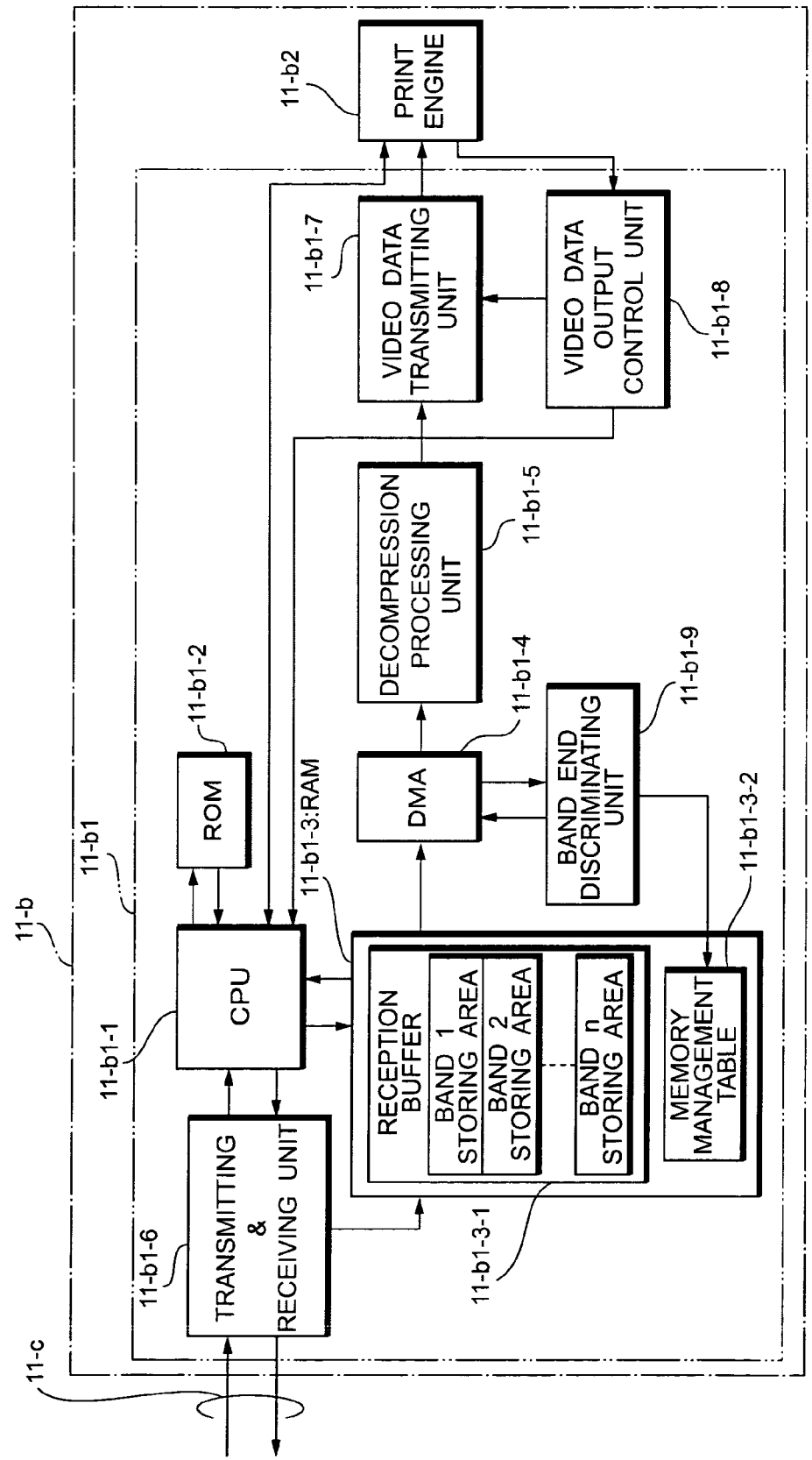
FIG. 1 is a block diagram showing a construction of an embodiment 1.

FIG. 1 is a block diagram of a construction of an embodiment 1.

Referring now to FIG. 1, a print system of the embodiment 1 includes a host (host computer) 11-*a*, a printer 11-*b*, and a network line 11-*c*.

The host 11-*a* is a portion for transmitting compression data whose printing has been requested to the printer 11-*b*. A plurality of hosts are often included in the print system. An application 11-*a*1, a driver 11-*a*2, a work area 11-*a*3, a transmitting and receiving unit 11-*a*4, and the like are provided in the host 11-*a*. The "compression data" mentioned here denotes band data obtained by dividing the image information of one page into a plurality of bands, converting them into the image data every band, and compressing.

The application 11-*a*1 is a portion for forming an image to be printed. For example, word processor software, CAD software, or the like corresponds to it.

The driver 11-*a*2 is a portion for converting the image formed by the application 11-*a*1 into the image data which can be printed on a band unit basis, compressing it, storing it into a frame buffer 11-*a*3-1, which will be explained hereinafter, and transmitting the stored compression data to the printer 11-*b*, which will be explained hereinafter.

The driver 11-*a*2 has information discriminating means 11-*a*2-1 and band reading means 11-*a*2-2.

The information discriminating means 11-*a*2-1 is a portion for specifying the compression data which is necessary to the printer 11-*b* on the basis of a page number and a band number of the data for jam recovery that is sent from the printer 11-*b* together with a data retransmitting request for the jam recovery in the case where a jam occurs in the printer 11-*b*, which will be explained hereinafter, and the data retransmitting request is made by the printer 11-*b*.

The band reading means 11-*a*2-2 is a portion for reading out the compression data for the jam recovery specified by the information discriminating means 11-*a*2-1 from the frame buffer 11-*a*3-1, which will be explained hereinafter, on the basis of a band management table 11-*a*3-2, which will be explained hereinafter, and executing preparation for retransmission.

The work area 11-*a*3 has: a work area for converting the image information formed by the application 11-*a*1 into the image data when a print request is made to the driver 11-*a*2 by the application 11-*a*1; the frame buffer 11-*a*3-1 for compressing the image data obtained after the conversion and storing it; and the band management table 11-*a*3-2 for managing the compression data.

The band management table 11-*a*3-2 will now be described.

Figures 2, 3:
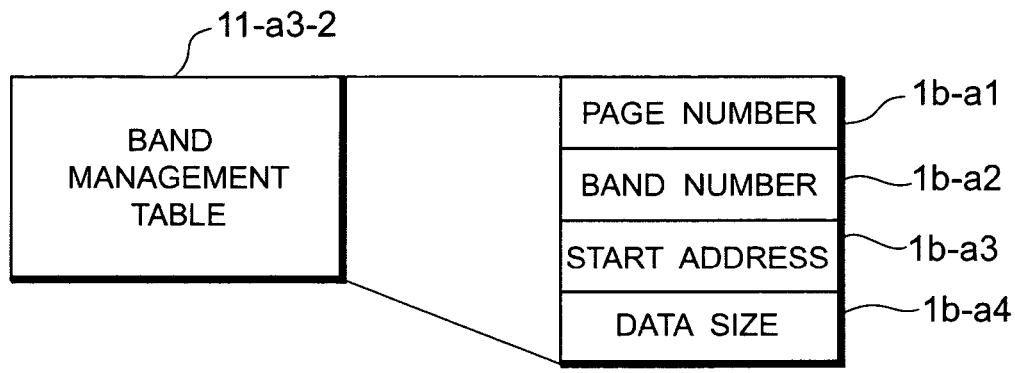
FIG. 2 is an explanatory diagram of contents of a band management table.
FIG. 3 is a diagram showing an example of the band management table.

FIG. 2 is an explanatory diagram of contents of the band management table.

FIG. 3 shows an example of the band management table.

As shown in FIG. 2, a page number 1*b*-*a*1, a band number 1*b*-*a*2, a start address 1*b*-*a*3, and a data size 1*b*-*a*4 are included in the band management table 11-*a*3-2.

The page number 1b-a1 shows the number of the page to which compression data of each band stored in the frame buffer 11-a3-1 (FIG. 1) corresponds.

The band number 1b-a2 shows the number of the band of the page shown by the page number 1b-a1 to which the compression data of each band stored in the frame buffer 11-a3-1 (FIG. 1) corresponds.

The start address 1b-a3 indicates a head address of the stored compression data of each band in order to show a location in the frame buffer 11-a3-1 (FIG. 1) where the compression data has been stored every band.

The data size 1b-a4 indicates a size of compression data stored from the start address 1b-a3.

The contents described above are shown in FIG. 3 as an example of the band management table 11-a3-2.

The work area 11-a3 (FIG. 1) is an area which is assured on the host when the print request is made by the application 11-a1 (FIG. 1) to the driver 11-a2 (FIG. 1) and which does not exist when the driver 11-a2 is not executing any process.

Returning to FIG. 1 again, the transmitting and receiving unit 11-a4 is a portion for transmitting the compression data stored in the frame buffer 11-a3-1 to the printer 11-b, which will be explained hereinafter, or receiving a status signal from the printer 11-b.

The printer 11-b is a portion for printing and outputting a reproduced image in response to a request from the host 11-a and includes a controller unit 11-b1 and a print engine 11-b2.

The controller unit 11-b1 comprises: a CPU 11-b1-1; a ROM 11-b1-2; a RAM 11-b1-3; a DMA 11-b1-4; a decompression processing unit 11-b1-5; a transmitting and receiving unit 11-b1-6; a video data transmitting unit 11-b1-7; a video data output control unit 11-b1-8; and a band end discriminating unit 11-b1-9.

The CPU 11-b1-1 is a central processing unit for controlling the whole controller unit 11-b1.

The ROM 11-b1-2 is a portion in which a control program for executing an arithmetic operating process which is executed by the CPU 11-b1-1 is stored.

The RAM 11-b1-3 has a reception buffer 11-b1-3-1 and a memory management table 11-b1-3-2.

The reception buffer 11-b1-3-1 is a portion for storing the compression data sent from the host 11-a. Storing areas of bands (1 to n) are provided in the reception buffer 11-b1-3-1. The corresponding compression data is stored into each storing area.

The memory management table 11-b1-3-2 will now be described.

Figure 4:
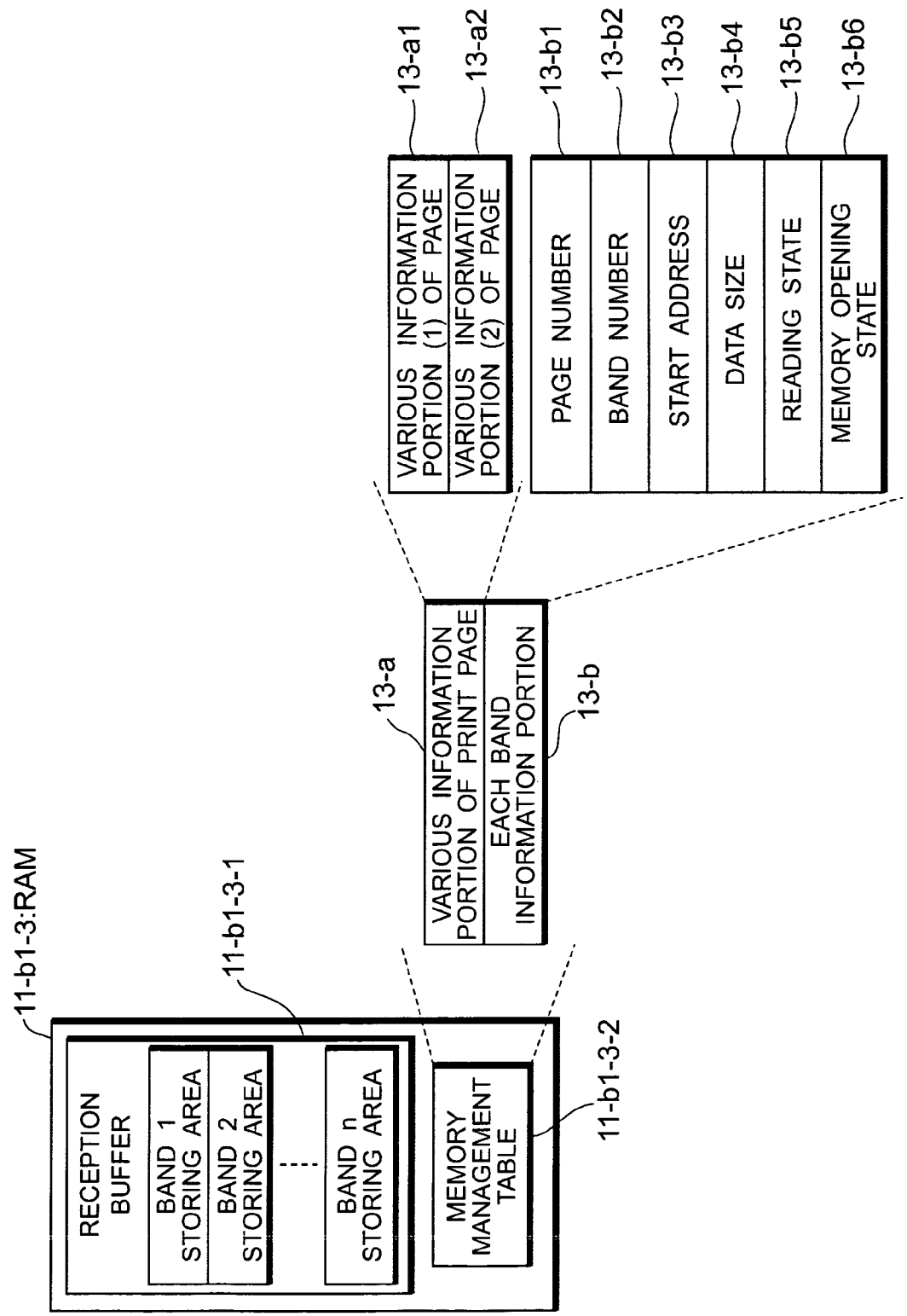
FIG. 4 is an explanatory diagram of contents of a memory management table.

FIG. 4 is an explanatory diagram of contents of the memory management table.

FIG. 5 shows an example of the memory management table.

As shown in FIG. 4, the memory management table 11-b1-3-2 comprises: a various information portion 13-a of a print page for storing information (for example, a line length, the number of lines, etc.) of the whole page of the compression data which is received from the host 11-a (FIG. 1); and each band information portion 13-b for storing various information of each compression data stored in each band storing area in the reception buffer 11-b1-3-1.

The various information portion 13-a of a print page comprises: a various information portion (1) 13-a1 of the page; and a various information portion (2) 13-a2 of the page. Various information of the page which is being printed and various information of the next page in the case where the next page exists are stored in those information portions 13-a1 and 13-a2.

Information such as page number 13-b1, band number 13-b2, start address 13-b3, data size 13-b4, reading state 13-b5, memory opening state 13-b6, and the like is included in each band information portion 13-b.

The page number 13-b1 indicates to which number of page the compression data stored in each band storing area in the reception buffer 11-b1-3-1 corresponds. The page number as information is sent from host.

The band number 13-b2 indicates to which number of band of the page shown by the page number 13-b1 the compression data stored in each band storing area in the reception buffer 11-b1-3-1 corresponds. The band number as information is sent from host.

The start address 13-b3 indicates a head of the compression data showing a location in the reception buffer 11-b1-3-1 where the compression data stored in each band storing area in the reception buffer 11-b1-3-1 has been stored.

The data size 13-b4 indicates a size of compression data stored in each band storing area in the reception buffer 11-b1-3-1 from the position shown by the start address 13-b3. The data size as information is sent from host.

The reading state 13-b5 indicates a result of discrimination about the completion of the reading. That is, the compression data stored in each band storing area in the reception buffer 11-b1-3-1 is read out by the DMA 11-b1-4 (FIG. 1), which will be explained hereinafter, whether or not the reading has been completed is discriminated by the band end discriminating unit 11-b1-9 (FIG. 1), which will be explained hereinafter, and the result of the discrimination is shown by the reading state 13-b5. For example, when all of the compression data stored in the storing area of the band 1 is read out by the DMA 11-b1-4, the band end discriminating unit 11-b1-9 determines that the reading state of the band-1 storing area indicates the completion of the reading, and writes information showing the completion of the reading into the reading state 13-b5 of the band 1.

The memory opening state 13-b6 indicates an opening state of the memory. That is, it is determined by the band end discriminating unit 11-b1-9 (FIG. 1) that the reading of the compression data stored in each band storing area in the reception buffer 11-b1-3-1 has already been completed, whether or not the memory corresponding to such a reading location has been opened by the CPU 11-b1-1 (FIG. 1) is discriminated, and the result of the discrimination is shown by the memory opening state 13-b6.

An example of the memory management table 11-b1-3-2 described above is shown in FIG. 5.

Returning to FIG. 1 again, the DMA 11-b1-4 is a portion for reading out the compression data from the reception buffer 11-b1-3-1 on the basis of the information of the start address 13-b3 (FIG. 4) and the data size 13-b4 (FIG. 4) stored in the memory management table 11-b1-3-2 and transferring the read-out compression data to the decompression processing unit 11-b1-5.

The decompression processing unit 11-b1-5 is a portion for decompressing the compression data stored in the reception buffer 11-b1-3-1 and, further, transferred from the DMA 11-b1-4 and converting it into video data.

The transmitting and receiving unit 11-b1-6 is a portion for receiving commands, various information of the print page, and the compression data which are transmitted from the host 11-a or transmitting various statuses of the printer 11-b to the host 11-a.

The video data transmitting unit 11-b1-7 is a portion for transferring the video data which has been decompressed and converted by the decompression processing unit 11-b1-5 to the print engine 11-b2, which will be explained hereinafter.

The video data output control unit 11-b1-8 is a portion for controlling the video data transmitting unit 11-b1-7 when information showing the occurrence of a jam is received from the print engine 11-b2 and stopping the transmission of the video data to the print engine 11-b2.

The band end discriminating unit 11-b1-9 is a portion for monitoring the compression data which is read out from the reception buffer 11-b1-3-1 on a band unit basis by the DMA 11-b1-4 and discriminating end timing of each band of the compression data which is read out by the DMA 11-b1-4. The band end discriminating unit 11-b1-9 is also a portion for updating the reading state 13-b5 (FIG. 4) in the memory management table 11-b1-3-2 when the completion of the reading of each band is determined here.

The print engine 11-b2 is a portion for receiving the video data from the controller unit 11-b1, transferring it to a print head, and printing it. The print engine 11-b2 is also a portion for monitoring a running state or the like of a print sheet and detecting a paper jam.

The network line 11-c is a communication path for connecting the host 11-a and the printer 11-b in the state where bidirectional communication can be made. It is desirable to use a parallel interface such as IEEE1284 standard, a serial interface such as USB, or the like, or it is also possible to use a local LAN or the like.

The operation of the embodiment 1 will now be described.

Figure 6:
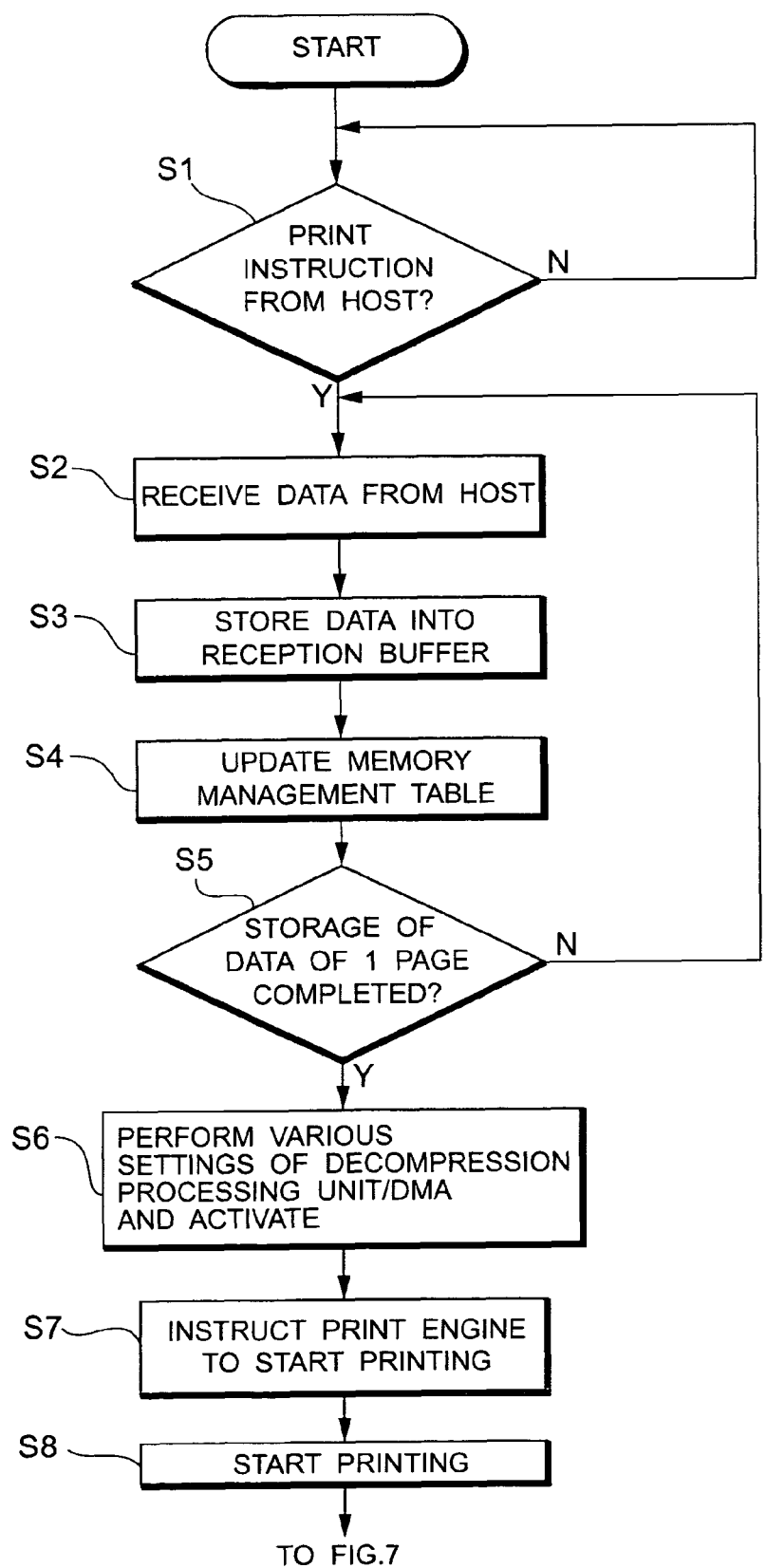
FIG. 6 is a flowchart (part 1) for the operation of a printer in the embodiment 1.

FIG. 6 is a flowchart (part 1) for the operation of the printer in the embodiment 1.

Figure 7:
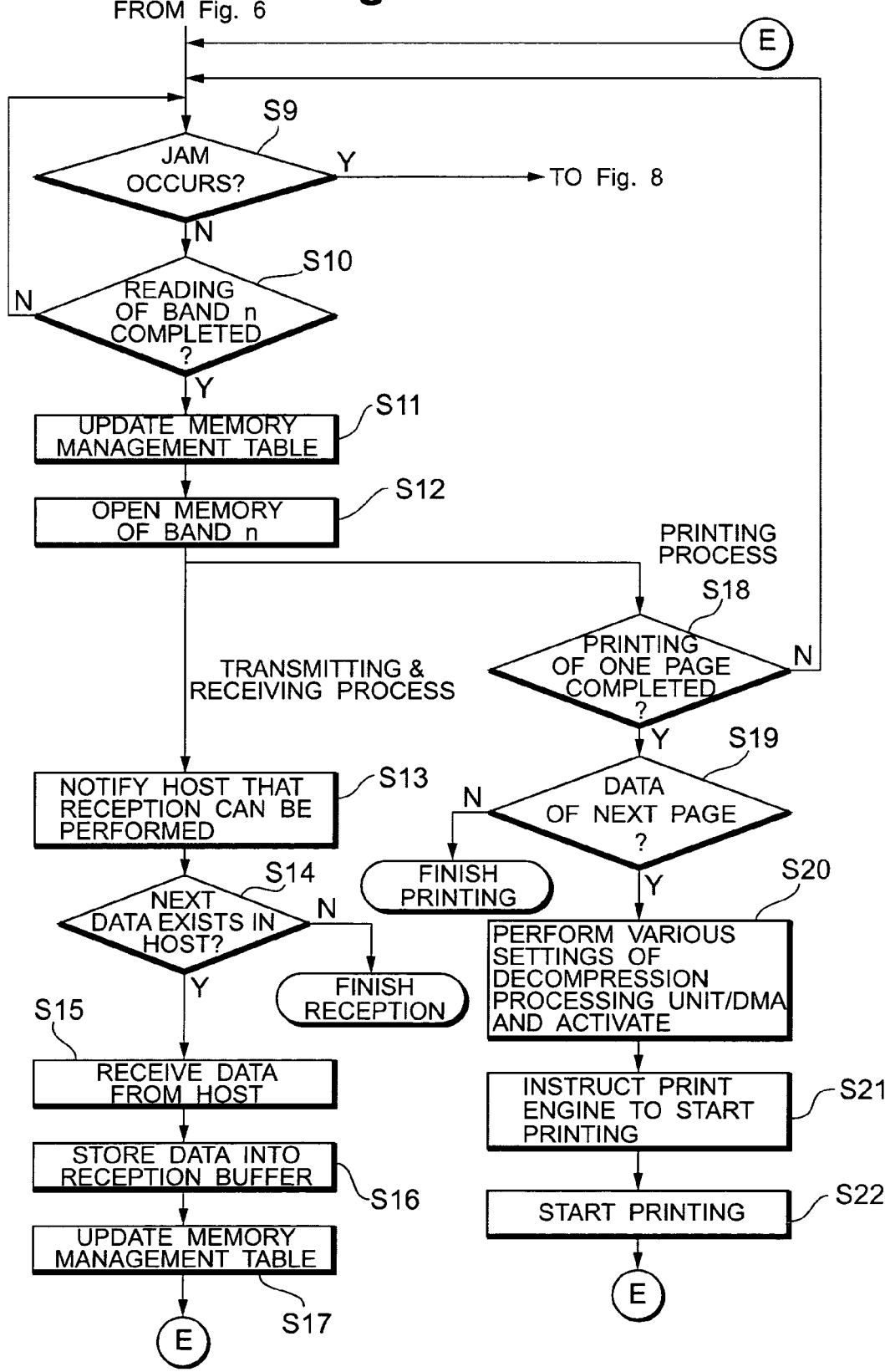
FIG. 7 is a flowchart (part 2) for the operation of the printer in the embodiment 1.

FIG. 7 is a flowchart (part 2) for the operation of the printer in the embodiment 1.

Figure 8:
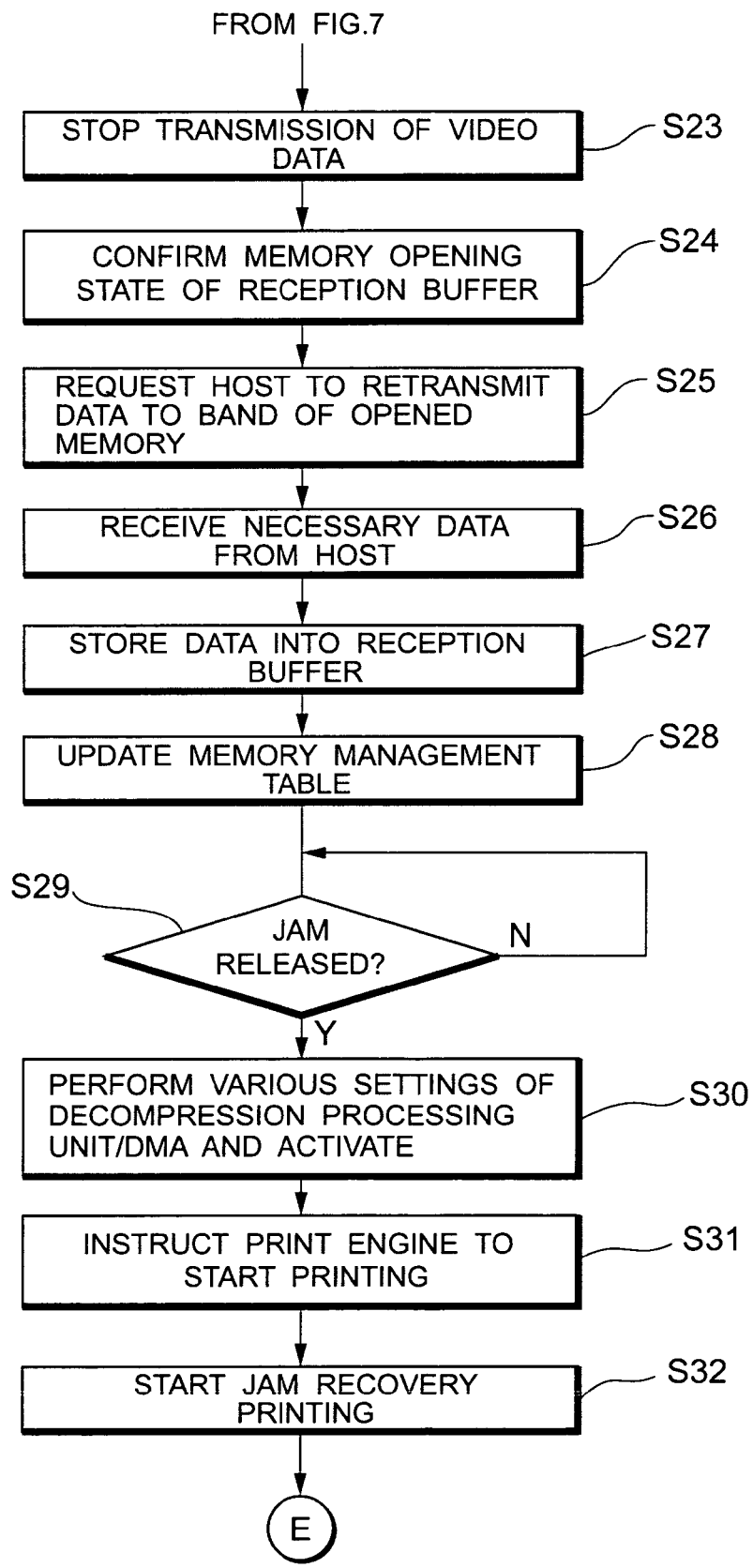
FIG. 8 is a flowchart (part 3) for the operation of the printer in the embodiment 1.

FIG. 8 is a flowchart (part 3) for the operation of the printer inside the embodiment 1.

The operation of the printer in the print system in the embodiment 1 will now be described hereinbelow in order of steps S1 to S32.

Step S1:
The printer 11-b (FIG. 1) is in a standby mode for waiting for a print request from the host 11-a (FIG. 1).

Step S2:
If the printer 11-b is in the state where the printer itself can receive when there is a print request from the host 11-a, the printer notifies the host 11-a of such a state and receives the data from the host 11-a.

Step S3:
If the received data is the various information of the print page, it is stored into the various information portion (1) 13-a1 of the page and the various information portion (2) 13-a2 of the page (FIG. 4). If the received data is the compression data, it is stored into each of the corresponding band storing areas (1 to n) in the reception buffer 11-b1-3-1 (FIG. 4).

Step S4:
When the compression data is stored into the corresponding band storing areas (1 to n) in the reception buffer 11-b1-3-1 (FIG. 4), the CPU 11-b1-1 (FIG. 1) updates each information of each band information portion 13-b (FIG. 4) in the memory management table 11-b1-3-2 (FIG. 4).

Step S5:
The data reception from the host 11-a (FIG. 1) is executed until all of the compression data of the bands (1 to n) is stored into each of the corresponding band storing areas. That is, the processes in steps S2 to S5 are repetitively executed until the reception of the compression data of one page from the host 11-a (FIG. 1) is completed.

Step S6:
When the compression data of one page is stored into the reception buffer 11-b1-3-1 (FIG. 1), the CPU 11-b1-1 (FIG. 1) executes various settings of the decompression processing unit 11-b1-5 (FIG. 1) and the DMA 11-b1-4 (FIG. 1) on the basis of each information in the memory management table 11-b1-3-2 (FIG. 1) and activates them.

Step S7:
The CPU 11-b1-1 (FIG. 1) instructs the print engine 11-b2 (FIG. 1) to start the printing.

Step S8:
The print engine 11-b2 (FIG. 1) receives the video data from the controller unit 11-b1 (FIG. 1) and starts the printing.

Step S9:
Simultaneously with the start of the printing, the print engine 11-b2 (FIG. 1) monitors the occurrence of a paper jam in parallel with the printing process. When the jam occurs, step S23 follows. If no jam occurs, step S10 follows.

Step S10:
The band end discriminating unit 11-b1-9 (FIG. 1) monitors the completion of the reading of the compression data of one band from the reception buffer 11-b1-3-1.

Step S11:
When the band end discriminating unit 11-b1-9 (FIG. 1) determines the completion of the reading, it writes information showing that the reading has been completed into the reading state 13-b5 (FIG. 4) in the memory management table 11-b1-3-2 and updates the information.

Step S12:
The CPU 11-b1-1 (FIG. 1) periodically opens the memory of the band storing area where the reading state 13-b5 (FIG. 4) of each band in the memory management table 11-b1-3-2 indicates the completion of the reading.

Step S13:
When the memory of the band storing area is opened, the CPU 11-b1-1 (FIG. 1) notifies the host 11-a that the data can be received.

Step S14:
At this time, if there is next data in the host 11-a, step S15 follows. If the next data does not exist, the reception is finished. In this step, the CPU performs such judgement on the basis of data existing information output from host or reception data.

Step S15:
The next data is received from the host 11-a.

Step S16:
If the received data is the various information of the print page, it is stored into the various information portion (1) 13-a1 of the page or the various information portion (2) 13-a2 of the page (FIG. 4). If the received data is the compression data, it is stored into each of the corresponding band storing areas (1 to n) in the reception buffer 11-b1-3-1 (FIG. 4).

Step S17:
When the compression data is stored into each of the corresponding band storing areas (1 to n) in the reception buffer 11-b1-3-1 (FIG. 4), the CPU 11-b1-1 (FIG. 1) updates each information of each band information portion 13-b (FIG. 4) in the memory management table 11-b1-3-2 (FIG. 1) and returns to step S9.

When the received data is the data of the second page, the data regarding the various information of the print page is stored into the various information portion (2) 13-a2 of the page (FIG. 4) of the various information portion 13-a of the print page. When the received data is the data of the third page, since the information of the first page does not exist already, the data is stored into the various information portion (1) 13-a1 of the page (FIG. 4). After that, each time the print page increases, the data regarding the various information of the print page is alternately stored into the various information portion (2) 13-*a*2 of the page (FIG. 4) and the various information portion (1) 13-*a*1 of the page (FIG. 4).

Step S18:

With executing step 13, the printer 11-*b* continues to monitor whether or not the printing of one page has been completed. The processes in steps S9 to S12 are repeated until the completion of the printing of one page. When the printing of one page is completed, the processing routine advances to step S19.

Step S19:

If the next page exists, step S20 follows. If there is no next page, the printing is finished.

Step S20:

The CPU 11-*b*1-1 (FIG. 1) executes the various settings of the decompression processing unit 11-*b*1-5 (FIG. 1) and the DMA 11-*b*1-4 (FIG. 1) on the basis of the information in the memory management table 11-*b*1-3-2 (FIG. 1) and activates them.

Step S21:

The CPU 11-*b*1-1 (FIG. 1) instructs the print engine 11-*b*2 (FIG. 1) to start the printing.

Step S22:

The print engine 11-*b*2 (FIG. 1) receives the video data from the controller unit 11-*b*1 (FIG. 1) and starts the printing. The processing routine is returned to step S9 again and the occurrence of the jam is monitored until the end of the printing. A flow in the case where the jam occurred will now be described.

Step S23:

When the video data output control unit 11-*b*1-8 (FIG. 1) is notified of the occurrence of the jam from the print engine 11-*b*2 (FIG. 1), the video data output control unit 11-*b*1-8 controls the video data transmitting unit 11-*b*1-7 so as to stop the transmission of the video data to the print engine 11-*b*2 (FIG. 1).

Step S24:

Simultaneously with that the video data output control unit 11-*b*1-8 (FIG. 1) is notified of the occurrence of the jam from the print engine 11-*b*2 (FIG. 1), the CPU 11-*b*1-1 (FIG. 1) is also notified. The CPU 11-*b*1-1 (FIG. 1) confirms the band reading state 13-*b*5 (FIG. 4) and the memory opening state 13-*b*6 (FIG. 4) of each band information portion 13-*b* in the memory management table 11-*b*1-3-2 (FIG. 4).

Step S25:

The CPU 11-*b*1-1 (FIG. 1) discriminates the band number (s) whose corresponding printing has been finished. The CPU notifies the host 11-*a* (FIG. 1) of the jam occurrence and the page number and band number of the compression data in which the memory has been opened, and requests the retransmission of the compression data necessary for the jam recovery.

Step S26:

The CPU 11-*b*1-1 (FIG. 1) receives again the information necessary for the jam recovery from the host 11-*a* (FIG. 1).

Step S27:

If the received data is the various information of the print page, it is stored into the various information portion (1) 13-*a*1 of the page or the various information portion (2) 13-*a*2 of the page (FIG. 4). If the received data is the compression data, it is stored into each of the corresponding band storing areas (1 to n) in the reception buffer 11-*b*1-3-1 (FIG. 4).

Step S28:

When the compression data is stored into each of the corresponding band storing areas (1 to n) in the reception buffer 11-*b*1-3-1 (FIG. 4), the CPU 11-*b*1-1 (FIG. 1) updates each information of each band information portion 13-*b* (FIG. 4) in the memory management table 11-*b*1-3-2 (FIG. 4).

Step S29:

The CPU 11-*b*1-1 (FIG. 1) waits for release of the jam. When the jam is released, step S30 follows.

Step S30:

The CPU 11-*b*1-1 (FIG. 1) executes the various settings of the decompression processing unit 11-*b*1-5 (FIG. 1) and the DMA 11-*b*1-4 (FIG. 1) on the basis of each information in the memory management table 11-*b*1-3-2 (FIG. 1) and activates them.

Step S31:

The CPU 11-*b*1-1 (FIG. 1) instructs the print engine 11-*b*2 (FIG. 1) to start the printing.

Step S32:

The print engine 11-*b*2 (FIG. 1) receives the video data from the controller unit 11-*b*1 (FIG. 1) and starts the jam recovery printing.

After that, the processing routine is returned to step S9 and the processes in steps S9 to S19 are repeated until the printing of the page in which the jam occurred is normally completed. Further, the processes in steps S9 to S32 are repeated until the printing of all pages is completed.

Changes in contents of the memory management table 11-*b*1-3-2 (FIG. 1) and the reception buffer 11-*b*1-3-1 (FIG. 1) until the printer 11-*b* (FIG. 1) receives the data of one page from the host 11-*a* (FIG. 1) will now be described.

FIG. 9 is an explanatory diagram (part 1) of a state change of the memory management table until the reception is completed after it is started.

FIG. 10 is an explanatory diagram (part 2) of the state change of the memory management table until the reception is completed after it is started.

FIG. 11 is an explanatory diagram (part 3) of the state change of the memory management table until the reception is completed after it is started.

Figure 12:
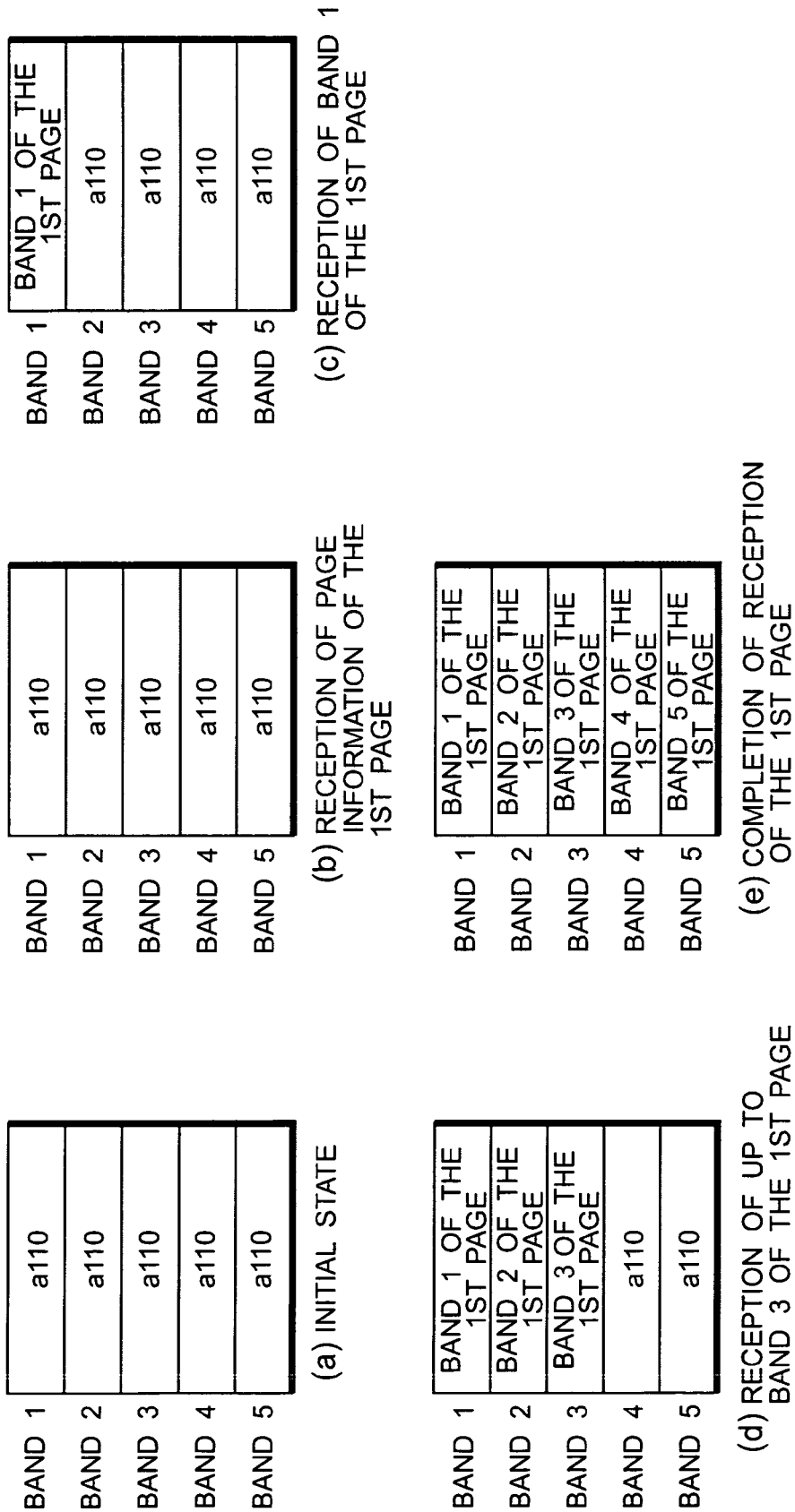
FIG. 12 is an explanatory diagram of a state change of a reception buffer until the reception is completed after it is started.

FIG. 12 is an explanatory diagram of a state change of the reception buffer until the reception is completed after it is started.

FIGS. 9 to 11 are the diagrams showing the state where the state of the memory management table which has already been described with reference to FIGS. 4 and 5 changes. For simplicity of explanation, the case where one page is divided into five bands will now be limitatively described.

FIG. 9(*a*) shows an initial state of the memory management table. FIG. 9(*b*) shows a state where the page information of the first page has been received.

FIG. 10(*c*) shows a state where the band 1 of the first page of the memory management table has been received. FIG. 10(*d*) shows a state where the data of up to the band 3 of the first page has been received. FIG. 11(*e*) shows a state where the reception of the first page of the memory management table has been completed.

FIG. 12 is a diagram showing the state where the state of the band storing area in the reception buffer 11-*b*1-3-1 (FIG. 1) changes.

For simplicity of explanation, the case where one page is divided into five bands will now be also limitatively described here.

FIG. 12(*a*) shows an initial state of the reception buffer. FIG. 12(*b*) shows a state where the page information of the first page has been received. FIG. 12(*c*) shows a state where the band 1 of the first page has been received. FIG. 12(*d*) shows a state where the data of up to the band 3 of the first page has been received. FIG. 12(*e*) shows a state where the reception of the first page has been completed.

In the initial state, as shown in FIG. 9(a), all information in the memory management table has been cleared to "0". All information in the reception buffer has also been cleared to "0" as shown in FIG. 12(a).

When the printer 11-b (FIG. 1) receives the page information of the first page, the page information of the first page is stored into the print page information portion (1) of the memory management table as shown in FIG. 9(b). However, since the reception buffer does not receive the compression data yet at this time, all of the information in the reception buffer has been cleared to "0" as shown in FIG. 12(b).

When the printer 11-b (FIG. 1) receives the band 1 of the first page, its contents are stored in a location showing the information of the band 1 in the memory management table as shown in FIG. 10(c). At this time, as shown in FIG. 12(c), the reception buffer receives the compression data of the band 1 and the compression data of the band 1 of the first page is stored into the band-I storing area.

When the printer 11-b (FIG. 1) receives the data of up to the band 3 of the first page, their contents are stored in locations showing the information of the bands 1, 2, and 3 in the memory management table as shown in FIG. 10(d). At this time, as shown in FIG. 12(d), the reception buffer receives the compression data of the bands 1 to 3, the compression data of the band 1 of the first page is written into the band-1 storing area, the compression data of the band 2 of the first page is written into the band-2 storing area, and the compression data of the band 3 of the first page is written into the band-3 storing area.

When the printer 11-b (FIG. 1) receives the data of all bands of the first page, their contents are stored in all locations showing the band information in the memory management table as shown in FIG. 11(e). At this time, as shown in FIG. 12(e), the reception buffer receives the compression data of all of the bands. The compression data of the corresponding bands is written into all of the band storing areas, respectively.

Subsequently, explanation will be made with respect to changes in contents in the memory management table 11-b1-3-2 (FIG. 1) and the reception buffer 11-b1-3-1 (FIG. 1) until the printing of the first page is completed after the printer 11-b (FIG. 1) receives the data of all of the bands of the first page and the print engine 11-b2 (FIG. 1) starts the printing.

FIG. 13 is an explanatory diagram (part 1) of the state change of the memory management table until the printing is completed after it is started.

FIG. 14 is an explanatory diagram (part 2) of the state change of the memory management table until the printing is completed after it is started.

FIG. 15 is an explanatory diagram (part 3) of the state change of the memory management table until the printing is completed after it is started.

FIG. 16 is an explanatory diagram (part 4) of the state change of the memory management table until the printing is completed after it is started.

FIG. 17 is an explanatory diagram of the state change of the reception buffer until the printing is completed after it is started.

FIGS. 13 to 16 are the diagrams showing the state where the state of the memory management table which has already been described with reference to FIGS. 4 and 5 changes until the printing is completed after it is started. For simplicity of explanation, the case where one page is divided into five bands will now be limitatively described.

FIG. 13(a) shows the state at the start of the printing of the memory management table. FIG. 13(b) shows the state where the band-1 storing area has been read and opened.

FIG. 14(c) shows the state where the band-2 storing area has been read and opened. FIG. 14(d) shows the state where the band-3 storing area has been read and opened.

FIG. 15(e) shows the state where the band-4 storing area has been read and opened. FIG. 15(f) shows the state where the band-5 storing area has been read and opened.

FIG. 16(g) shows the state where the printing of the first page has been completed.

FIG. 17 is the diagram showing the state where the state of the band storing area in the reception buffer 11-b1-3-1 changes until the printing is completed after it is started. For simplicity of explanation, the case where one page is divided into five bands will now be also limitatively described here.

FIG. 17(a) shows the state at the start of the printing of the reception buffer. FIG. 17(b) shows the state where the memory of the band-1 storing area has been opened. FIG. 17(c) shows the state where the memory of the band-2 storing area has been opened. FIG. 17(d) shows the state where the memory of the band-3 storing area has been opened. FIG. 17(e) shows the state where the memory of the band-4 storing area has been opened. FIG. 17(f) shows the state where the memory of the band-5 storing area has been opened. FIG. 17(g) shows the state where the printing of the first page has been completed.

At the start of the printing, the memory management table is in the same state as the state (FIG. 11(e)) where the reception of the compression data of one page has been completed as shown in FIG. 13(a). The reception buffer is also in the same state as the state (FIG. 12(e)) where the reception of the compression data of one page has been completed as shown in FIG. 17(a).

When the DMA 11-b1-4 (FIG. 1) completes the reading of the compression data of the band 1 of the first page, the reading state of the band 1 in the memory management table is rewritten to "1" as shown in FIG. 13(b). After that, the CPU 11-b1 (FIG. 1) reads "1", opens the storing area of the band 1, and rewrites the memory opening state to "1". At this time, the reception buffer enters the state where the band-1 storing area is opened as shown in FIG. 17(b).

When the DMA 11-b1-4 (FIG. 1) completes the reading of the compression data of the band 2 of the first page, the reading state of the band 2 in the memory management table is rewritten to "1" as shown in FIG. 14(c). After that, the CPU 11-b1 (FIG. 1) reads "1", opens the storing area of the band 2, and rewrites the memory opening state to "1". At this time, the reception buffer enters the state where the band-2 storing area is opened as shown in FIG. 17(c).

Since the band-1 storing area has already been opened at this point of time, the printer 11-b (FIG. 1) receives the page information of the second page from the host 11-a (FIG. 1) and stores it into the page various information portion (2). Further, the compression data of the band 1 of the second page is stored into the band-i storing area.

When the DMA 11-b1-1 (FIG. 1) completes the reading of the compression data of the band 3 of the first page, the reading state of the band 3 in the memory management table is rewritten to "1" as shown in FIG. 14(d). After that, the CPU 11-b1 (FIG. 1) reads "1", opens the storing area of the band 3, and rewrites the memory opening state to "1". At this time, the reception buffer enters the state where the band-3 storing area is opened as shown in FIG. 17(d).

Since the band-2 storing area has already been opened at this point of time, the printer 11-b (FIG. 1) receives the compression data of the band 2 of the second page from the host 11-a (FIG. 1) and stores it.

Processes similar to those mentioned above are also executed hereinbelow with respect to the compression data of the band 4 and the compression data of the band 5 of the first page as shown in FIG. 15. All contents in the memory management table are changed to the contents of the second page as shown in FIG. 16(*g*). Similarly, as contents in the reception buffer, the contents of the second page are disclosed in all of the storing areas as shown in FIG. 17(*g*).

States of the memory management table 11-*b*1-3-2 (FIG. 1) and the reception buffer 11-*b*1-3-1 (FIG. 1) when the jam occurs will now be described.

Explanation will be made here on the assumption that among the bands 1 to 5, the opening of the memory of the band-2 storing area of the first page has been completed and the jam occurred during the reading of the compression data in the band-3 storing area of the first page.

FIG. 18 is an explanatory diagram of a state of the jam occurrence on the way of the band 3.

FIG. 18(*a*) shows the state of the memory management table and FIG. 18(*b*) shows the state of the reception buffer.

From the diagram, the compression data of the band 1 of the second page has already been stored in the band-1 storing area and the memory of the band-2 storing area has already been opened. In this state, since the data of up to the band 2 of the first page has already been cleared from the reception buffer 11-*b*1-3-1, the printer 11-*b* (FIG. 1) requests the host 11-*a* (FIG. 1) to transmit the data of up to the band 2 of the first page for the jam recovery again.

FIG. 19 is an explanatory diagram of the state where the band 1 has been received again.

FIG. 19(*a*) shows the state of the memory management table and FIG. 19(*b*) shows the state of the reception buffer.

From the diagram, the printer 11-*b* (FIG. 1) receives the compression data of the band 1 of the first page from the host 11-*a* (FIG. 1) and the band-I storing area where the compression data of the band 1 of the second page has been stored is overwritten by the compression data of the band 1 of the first page and stored.

FIG. 20 is an explanatory diagram of the state where the data of up to the band 2 has been received again.

FIG. 20(*a*) shows the state of the memory management table and FIG. 20(*b*)-shows the state of the reception buffer.

From the diagram, there is shown a state where the printer 11-*b* (FIG. 1) further receives the compression data of the band 2 of the first page from the host 11-*a* (FIG. 1) and the compression data of the band 2 of the first page has been stored in the storing area of the band 2 in the open state.

At this time, since the compression data of the band 2 of the first page has been written again, the reading state and the memory opening state of the band-2 storing area are updated to "0" respectively. Further, the reading state of the band-3 storing area is also updated to "0". Thus, all of the data in the memory management table and the reception buffer is returned to the states just before the printing of one page.

The operation of the host in the embodiment 1 will now be described.

Figure 21:
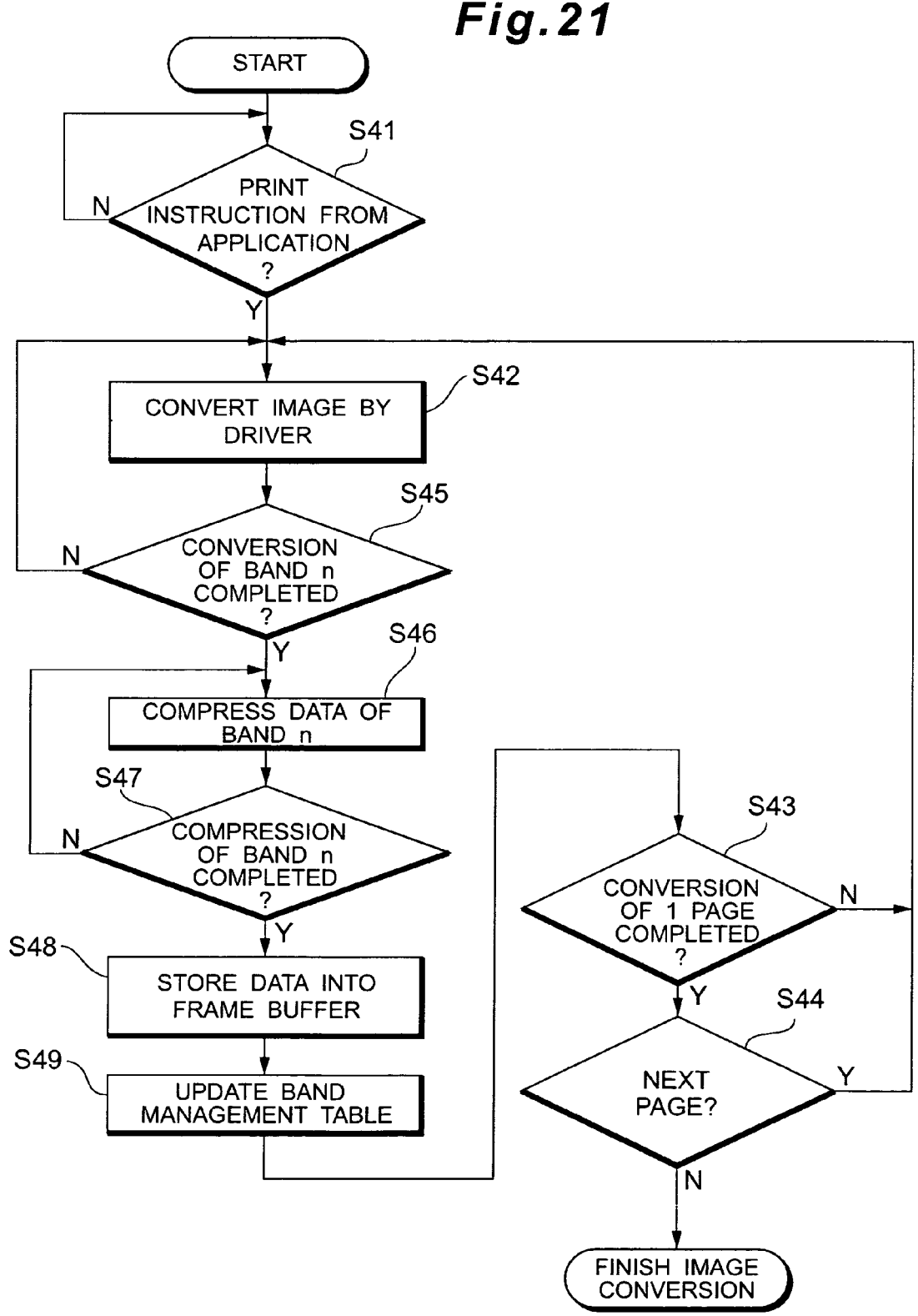
FIG. 21 is a flowchart (part 1) for the operation of a host in the embodiment 1.

FIG. 21 is a flowchart (part 1) for the operation of the host in the embodiment 1.

Figure 22:
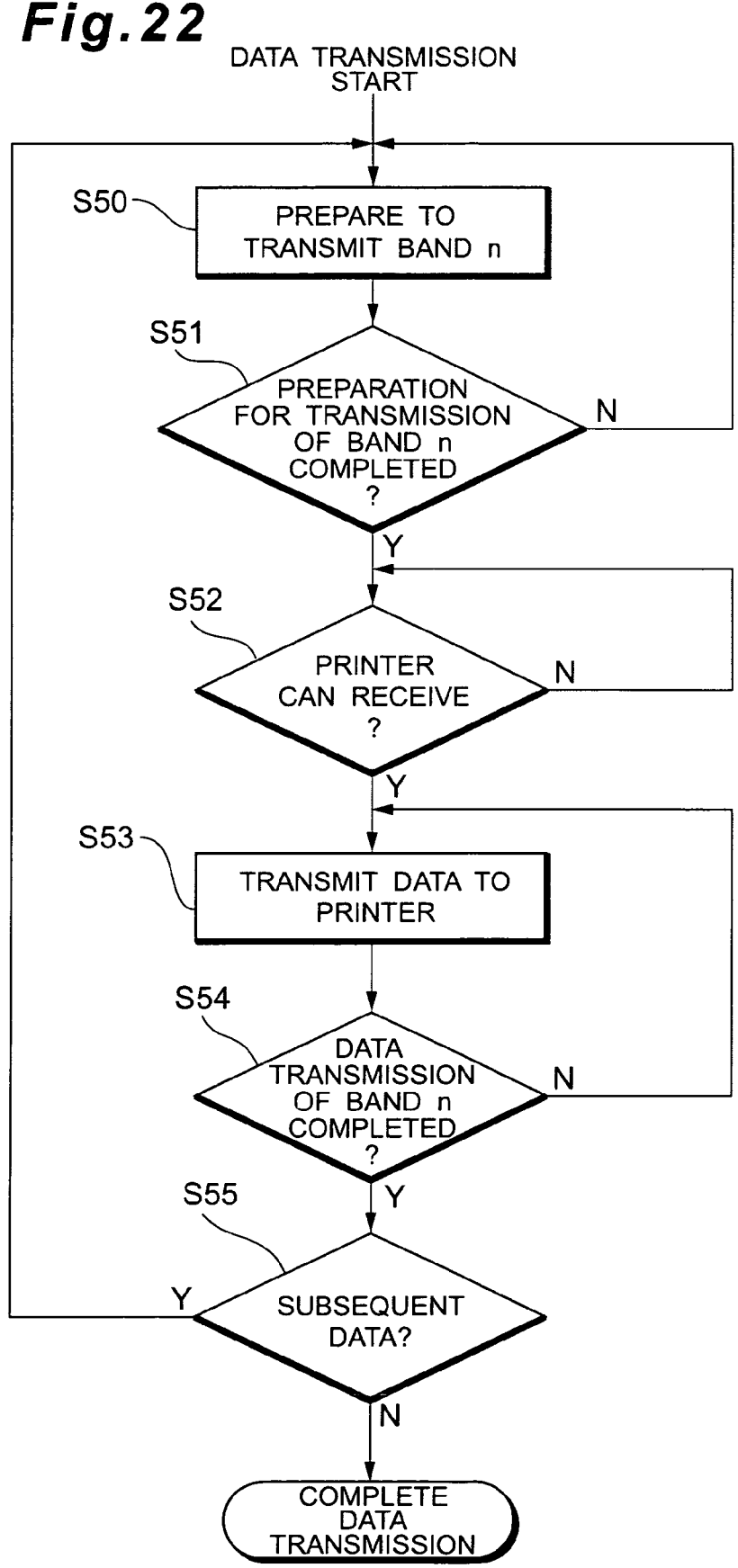
FIG. 22 is a flowchart (part 2) for the operation of the host in the embodiment 1.

FIG. 22 is a flowchart (part 2) for the operation of the host in the embodiment 1.

The operation of the host used in the print system in the embodiment 1 will now be described hereinbelow in order of steps S41 to S55.

Step S41:

The driver 11-*a*2 (FIG. 1) is in the standby mode until a print instruction is issued after the image information is formed by the application 11-*a*1 (FIG. 1).

Step S42:

When the driver 11-*a*2 (FIG. 1) receives the print instruction from the application 11-*a*1 (FIG. 1), it converts the image information into the image data that can be printed by the printer.

Step S43:

The driver 11-*a*2 (FIG. 1) converts the image information on a band unit basis. The processes in steps S42 and S43 are repeated until the conversion of one page is completed. When the conversion of one page is completed, the processing routine advances to step S44.

Step S44:

The driver 11-*a*2 (FIG. 1) converts the image information on a band unit basis. When the image information of a plurality of pages exists, the processes of steps S42 to S44 are repeated until the conversion of the image information of all pages of each band is completed. The image conversion is finished when the conversion of all pages is completed.

Step S45:

In the converting process of the image information (step S42), the image data is extracted each time the conversion of one band is finished and the processing routine advances to step S46.

Step S46:

The driver 11-*a*2 (FIG. 1) compresses the image data converted on a band unit basis.

Step S47:

The driver 11-*a*2 (FIG. 1) repeats the processes of steps S46 and S47 until the compression of the band unit is finished. When the process for compressing the image data on a band unit basis is finished, step S48 follows.

Step S48:

The driver 11-*a*2 (FIG. 1) stores the compression-completed compression data of the band unit into the frame buffer 11-*a*3-1 (FIG. 1).

Step S49:

The driver 11-*a*2 (FIG. 1) writes information regarding the compression data stored in the frame buffer 11-*a*3-1 (FIG. 1) and updates the band management table 11-*a*3-2 (FIG. 1). The processes of steps S45 to S49 are repetitively executed in parallel with processes of step S50 and subsequent steps.

Step S50:

When the compression data of one band is stored into the frame buffer 11-*a*3-1 and the updating of the band management table 11-*a*3-2 is completed, the driver 11-*a*2 (FIG. 1) prepares for transmission of the process-completed band compression data.

Step S51:

The driver 11-*a*2 (FIG. 1) repeats processes of steps S50 and S51 until the preparation for transmission of the band unit is finished. When the preparation for transmission of the band unit is finished, step S52 follows.

Step S52:

The driver 11-*a*2 (FIG. 1) waits for reception of a reception possible notification showing whether or not the printer 11-*b* (FIG. 1) can receive the data.

Step S53:

When the printer 11-*b* (FIG. 1) can receive the data, the driver 11-*a*2 (FIG. 1) receives a reception possible notification and transmits the compression data to the printer 11-*b* (FIG. 1) through the transmitting and receiving unit 11-*a*4 (FIG. 1).

Step S54:

The driver 11-*a*2 (FIG. 1) repeats processes of steps S53 and S54 until the transmission of the compression data of the band unit is finished. When the transmission of the band unit is finished, step S55 follows.

Step S55:

If the subsequent compression data exists, the driver 11-a2 (FIG. 1) subsequently repeats the processes of steps S50 to S55. The present processing routine is finished after all of the compression data is transmitted to the printer 11-b (FIG. 1).

The operation of the host at the time of the jam recovery in the embodiment 1 will now be described.

Figure 23:
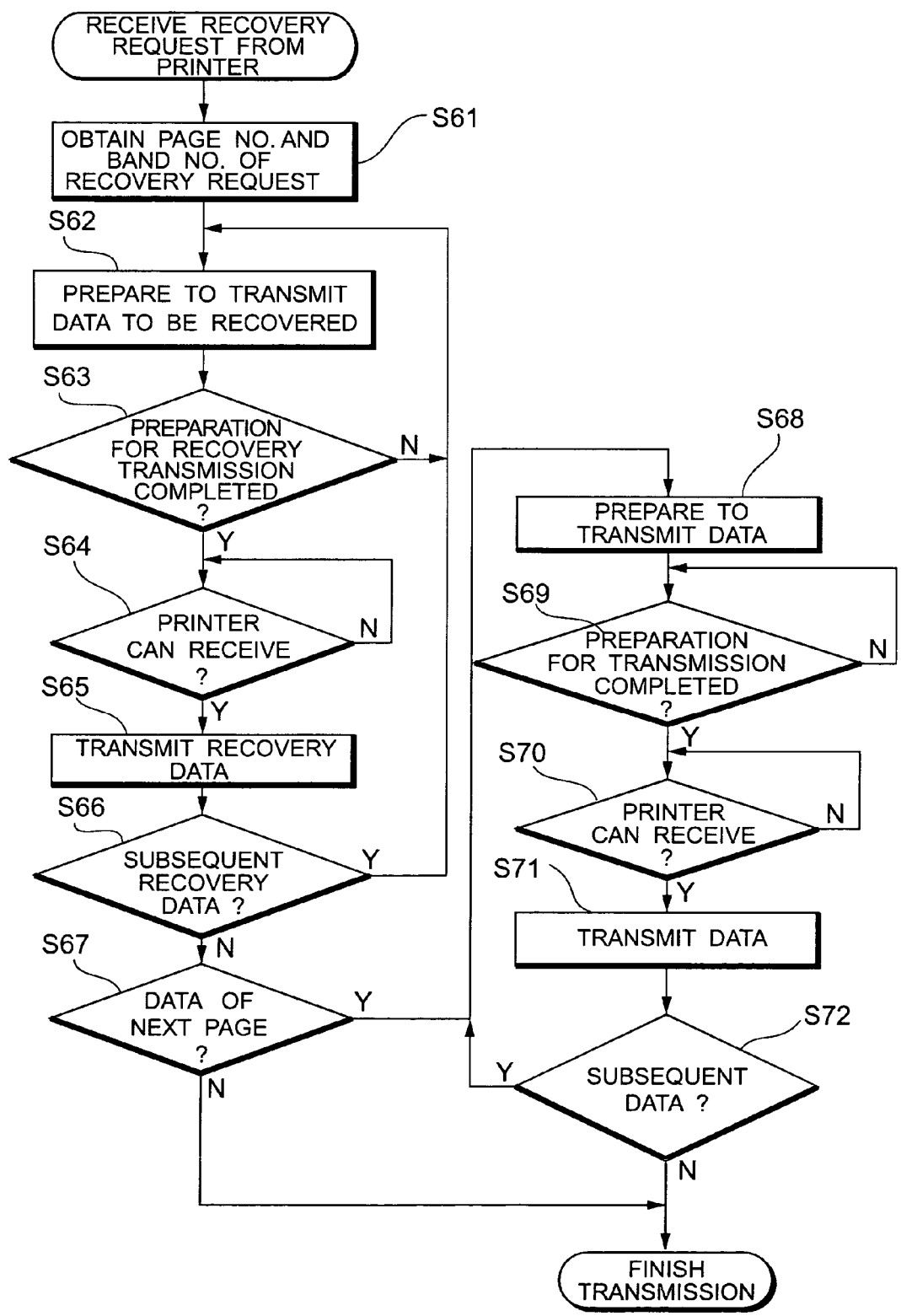
FIG. 23 is a flowchart for the operation of the host at the time of jam recovery in the embodiment 1.

FIG. 23 is a flowchart for the operation of the host at the time of the jam recovery in the embodiment 1.

The operation of the host at the time of the jam recovery in the print system in the embodiment 1 will now be described hereinbelow in order of steps S61 to S72.

In step S25 (FIG. 8) mentioned above, the CPU 11-b1-1 (FIG. 1) discriminates the band number(s) whose corresponding printing has been finished. This flow is started when the CPU notifies the host 11-a of the jam occurrence and the page number and band number of the compression data in which the memory has already been opened and requests the retransmission of the compression data necessary for the jam recovery.

Step S61:

The host 11-a (FIG. 1) receives the notification of the jam occurrence and the page number and band number of the jam recovery data which is necessary for the printer from the printer 11-b.

Step S62:

If the compression data which is at present being transmitted exists, the host 11-a (FIG. 1) cancels the transmitting process. On the basis of the information in the band management table 11-a3-2 (FIG. 1), the host 11-a (FIG. 1) reads out the compression data for the jam recovery from the frame buffer 11-a3-1 (FIG. 1) discriminated by the information discriminating means 11-a2-1 (FIG. 1) and prepares to retransmit it to the printer 11-b (FIG. 1).

Step S63:

When the host 11-a (FIG. 1) completes the preparation for the retransmission, the processing routine advances to step S64.

Step S64:

The host 11-a (FIG. 1) waits until the printer 11-b (FIG. 1) enters the state where it can receive the compression data.

Step S65:

When the printer 11-b (FIG. 1) can receive the compression data, the host 11-a (FIG. 1) transmits the compression data for the jam recovery to the printer 11-b (FIG. 1).

Step S66:

The host 11-a (FIG. 1) repeats the processes of steps S61 to S66 to transmit all of the compression data for the jam recovery until the transmission of all of the compression data for the jam recovery is completed.

Step S67:

If the compression data after the page in which the jam occurred exists after the transmission of the compression data for the jam recovery is completed, the host 11-a (FIG. 1) advances to step S68. If the compression data after the page in which the jam occurred does not exist, the host finishes the transmission.

Step S68:

The host 11-a (FIG. 1) prepares to transmit the compression data of the next page.

Step S69:

When the host 11-a (FIG. 1) completes the preparation for the transmission, step S70 follows.

Step S70:

The host 11-a (FIG. 1) waits until the printer 11-b (FIG. 1) enters the state where it can receive the compression data.

Step S71:

When the printer 11-b (FIG. 1) enters the state where it can receive the compression data, the host 11-a (FIG. 1) transmits the compression data to the printer 11-b (FIG. 1).

Step S72:

The host 11-a (FIG. 1) repeats the processes of steps S68 to S72 to transmit all of the compression data of the page in which the jam occurred and subsequent pages until the transmission of all of the compression data is completed. When the transmission is completed, the processing routine is finished.

Although the invention has been described limitatively with respect to the case where each component portion is constructed as an individual block, the invention is not limited to such an example. That is, all or a part of the component portions can be constructed as a part of functions of a CPU (not shown) provided in the host 11-a (FIG. 1) or a CPU 11-b1-1 provided for the controller unit 11-b1.

A control unit in claims corresponds to the CPU 11-b1-1 in the embodiments. An image forming apparatus in claims corresponds to the printer 11-b in the embodiments.

As described above, the print system of the embodiment 1 comprises: the video output control unit which stops the transmission of the compression data when the jam occurs; and the band end discriminating unit which monitors the reading of the compression data in the reception buffer, when the reading of the compression data is completed, updates progress of the corresponding compression data in the memory managing means to the opening of the memory, and enables the compression data of the next page to be received into the corresponding storing area. Thus, when the jam occurs, the control unit can receive again all of the compression data whose reading has been completed in the page to which the compression data whose reading has been stopped belongs and store them into each of the corresponding storing areas again. Such an effect that the time that is required for the communication between the host and the printer at the time of the jam recovery can be shortened is obtained.

Since the specific management of the band which the host should transmit again becomes easy, such an effect that the it can be executed by the simple construction as mentioned above is obtained.

Embodiment 2

According to a print system in the embodiment 2, printer status discriminating means which counts the number of pages of the compression data whose transmission has been completed and the reception possible notification received from the printer is provided for the host. Thus, when the printer merely notifies the host of only the jam occurrence, the host can specify the compression data necessary for the jam recovery and retransmit it. To accomplish the above object, the print system in the embodiment 2 is constructed as follows.

FIG. 24 is a block diagram showing a construction of the embodiment 2.

Referring to the diagram, the print system in the embodiment 2 includes a host 21-a, the printer 11-b, and the network line 11-c.

Only points different from the embodiment 1 will now be described hereinbelow.

A driver 21-a2 is a portion for converting the image formed by the application 11-a1 into the printable image data on a band unit basis, compressing it, storing it into the frame buffer 11-a3-1, and transmitting the stored compression data to the printer 11-b.

The driver 21-*a*2 has printer status discriminating means 21-*a*2-1 and the band reading means 11-*a*2-2.

The printer status discriminating means 21-*a*2-1 is a portion for monitoring the number of pages whose transmission has been completed after the compression data of one page is transmitted to the printer 11-*b*, counting the reception possible notification each time it is received from the printer 11-*b*, and monitoring a consumption amount of the compression data stored in the reception buffer 11-*b*1-3-1 of the printer 11-*b*.

The driver 21-*a*2 is a portion for specifying the compression data for the jam recovery that is necessary for the printer 11-*b* for the jam recovery on the basis of the number of pages and the count number of the reception possible notification which have been monitored when the jam occurs in the printer 11-*b*. Since all other component portions are similar to those in the embodiment 1, their description is omitted here.

The operation of the embodiment 2 will now be described.

Figure 25:
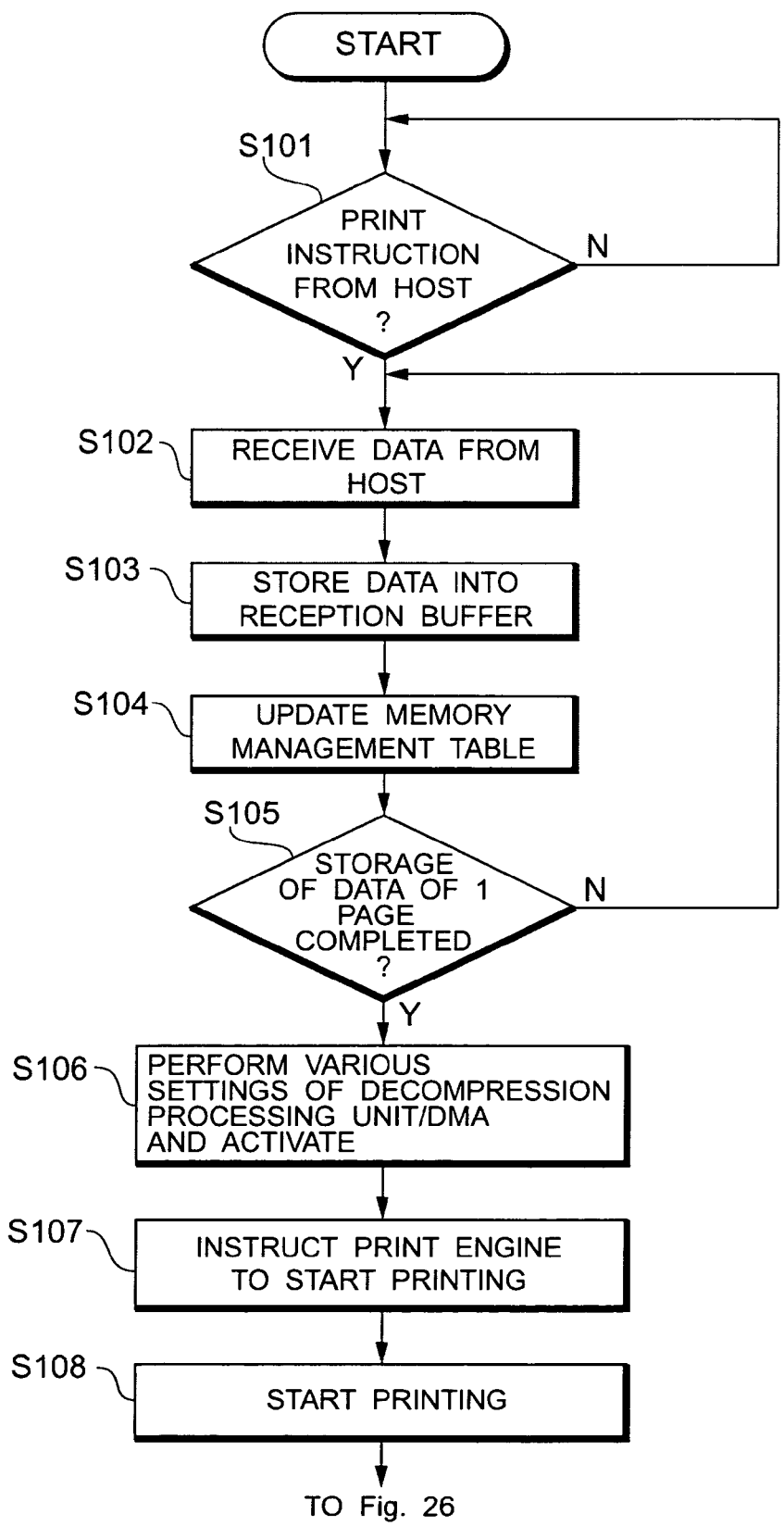
FIG. 25 is a flowchart (part 1) for the operation of a printer in the embodiment 2.

FIG. 25 is a flowchart (part 1) for the operation of the printer in the embodiment 2.

Figure 26:
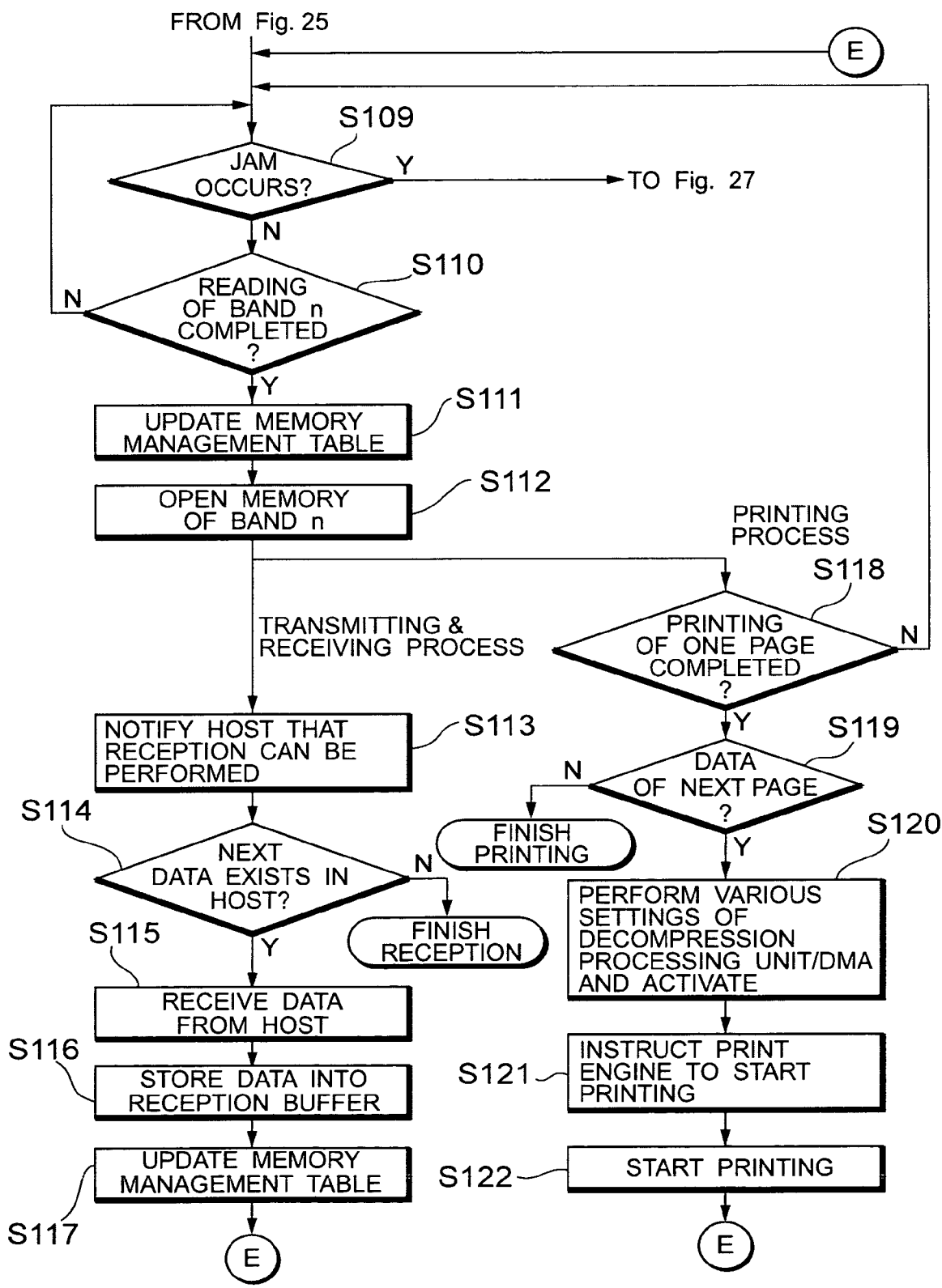
FIG. 26 is a flowchart (part 2) for the operation of the printer in the embodiment 2.

FIG. 26 is a flowchart (part 2) for the operation of the printer in the embodiment 2.

Figure 27:
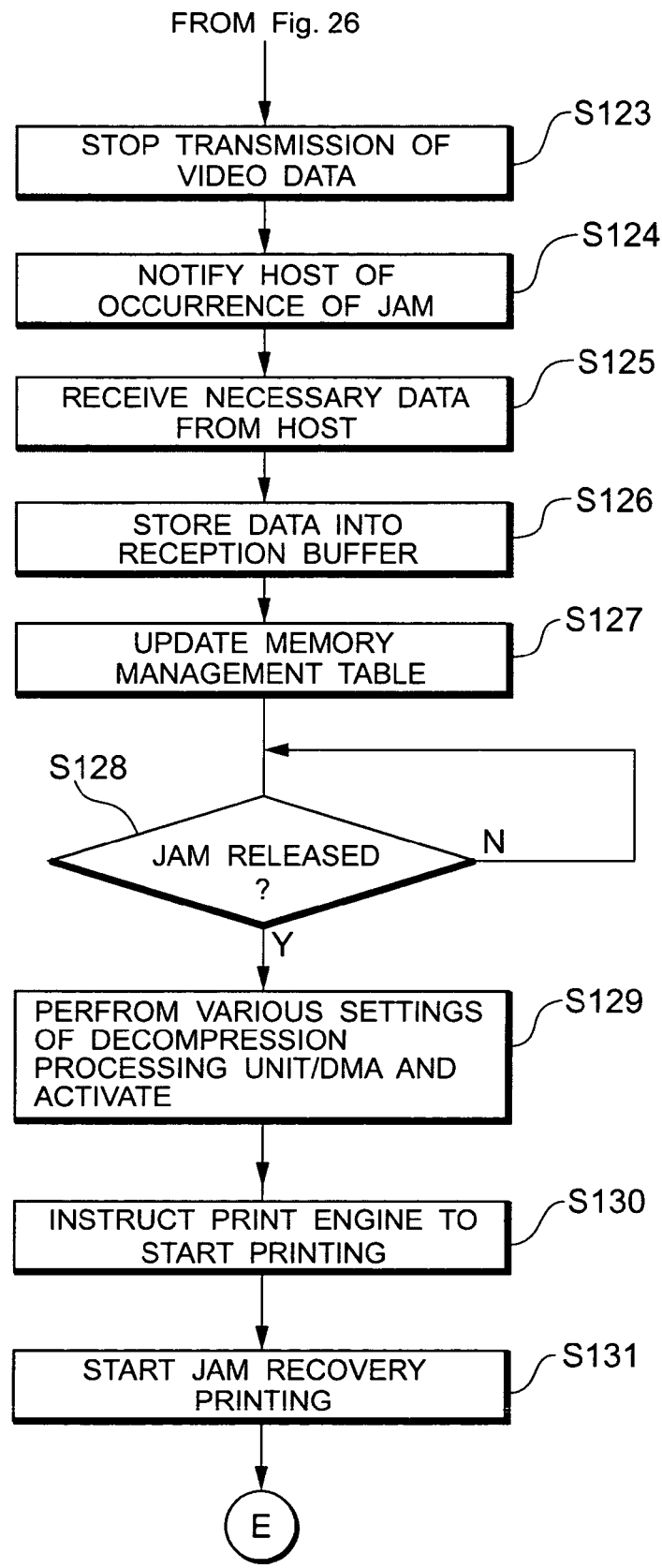
FIG. 27 is a flowchart (part 3) for the operation of the printer in the embodiment 2.

FIG. 27 is a flowchart (part 3) for the operation of the printer in the embodiment 2.

The operation of the printer which is used in the print system in the embodiment 2 will now be described hereinbelow in order of steps S101 to S131.

Since processes of steps S101 to S122 are substantially the same as those of steps S1 to S22 in the embodiment 1, their explanation is omitted here. The processes of step S123 and subsequent steps will be described.

Step S123:
When the jam occurrence is detected, the video data output control unit 11-*b*1-8 (FIG. 24) stops the transmission of the video data to the print engine 11-*b*2.

Step S124:
Simultaneously with that the video data output control unit 11-*b*1-8 (FIG. 24) is notified of the jam occurrence from the print engine 11-*b*2 (FIG. 24), the CPU 11-*b*1-1 (FIG. 24) is also notified of it. The CPU 11-*b*1-1 (FIG. 24) notifies the host 21-*a* of the jam occurrence.

Step S125:
The CPU 11-*b*1-1 (FIG. 24) receives the information necessary for the jam recovery from the host 21-*a* again.

Step S126:
If the received data is the various information of the print page, it is stored into the various information portion (1) 13-*a*1 of the page or the various information portion (2) 13-*a*2 of the page (FIG. 4). If the received data is the compression data, it is stored into each of the corresponding band storing areas (1 to n) in the reception buffer 11-*b*1-3-1 (FIG. 24).

Step S127:
When the compression data is stored into each of the corresponding band storing areas (1 to n) in the reception buffer 11-*b*1-3-1 (FIG. 24), the CPU 11-*b*1-1 (FIG. 24) updates each information of each band information portion 13-*b* (FIG. 24) in the memory management table 11-*b*1-3-2 (FIG. 4).

Step S128:
The CPU 11-*b*1-1 (FIG. 24) waits for release of the jam. When the jam is released, step S129 follows.

Step S129:
The CPU 11-*b*1-1 (FIG. 24) executes the various settings of the decompression processing unit 11-*b*1-5 (FIG. 24) and the DMA 11-*b*1-4 (FIG. 24) on the basis of each information in the memory management table 11-*b*1-3-2 (FIG. 24) and activates them.

Step S130:
The CPU 11-*b*1-1 (FIG. 24) instructs the print engine 11-*b*2 (FIG. 24) to start the printing.

Step S131:
The print engine 11-*b*2 (FIG. 24) receives the video data from the controller unit 11-*b*1 (FIG. 24) and starts the jam recovery printing.

After that, the processing routine is returned to step S109 until the printing of the page in which the jam occurred is normally completed and the processes of steps S109 to S119 are repeated until the printing of all pages is completed.

The operation of the host in the embodiment 2 will now be described.

Figure 28:
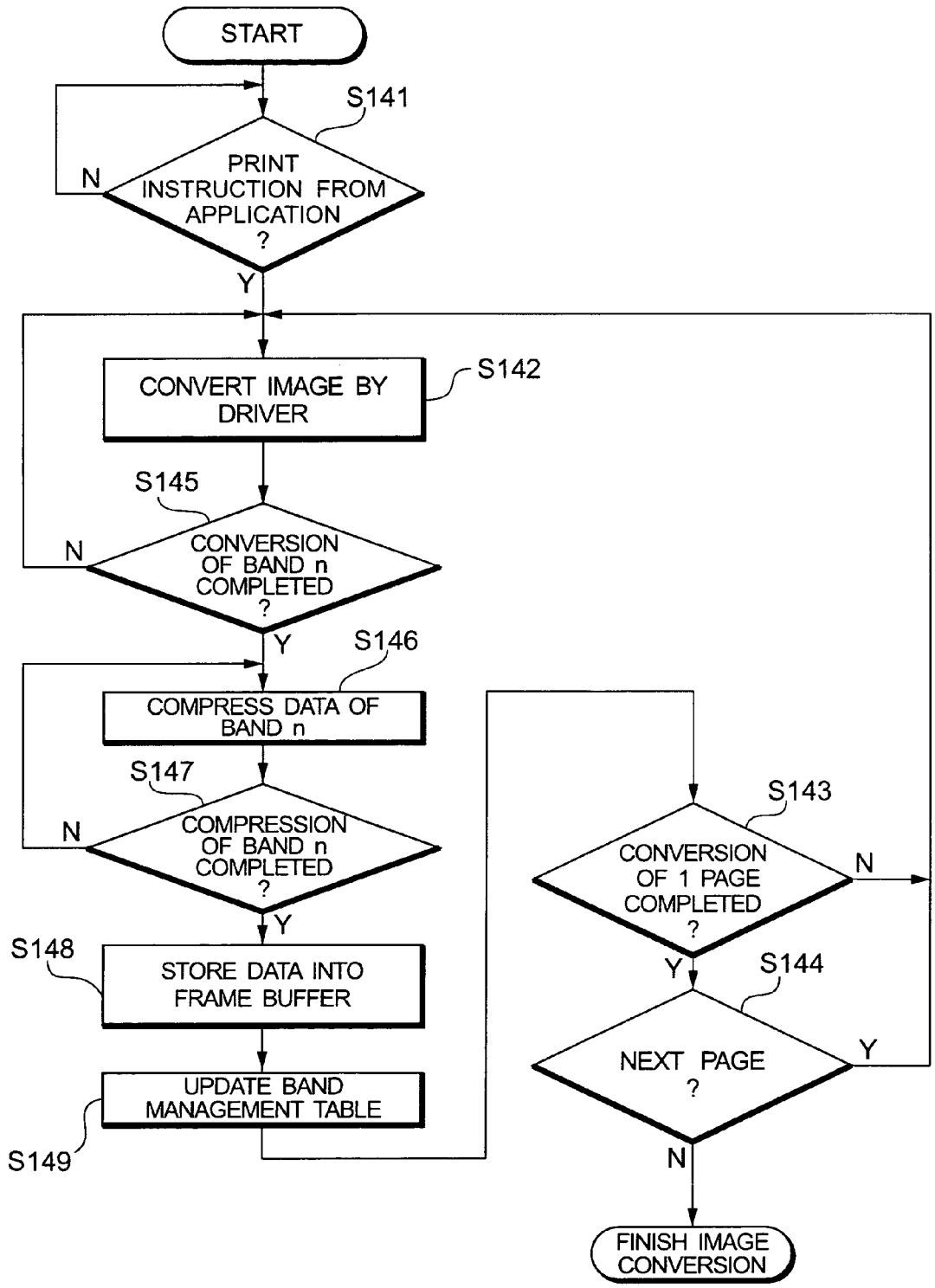
FIG. 28 is a flowchart (part 1) for the operation of a host in the embodiment 2.

FIG. 28 is a flowchart (part 1) for the operation of the host in the embodiment 2.

Figure 29:
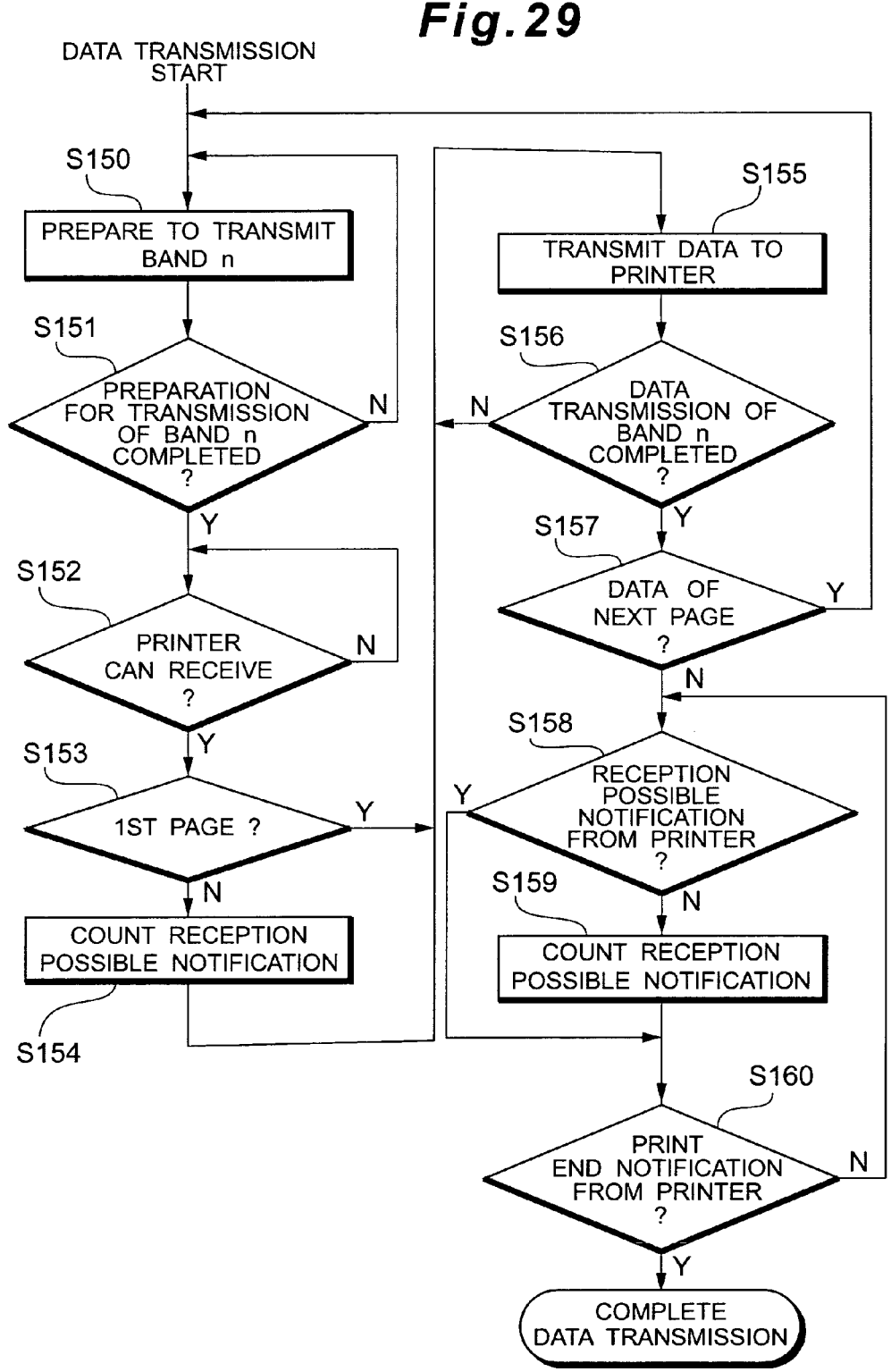
FIG. 29 is a flowchart (part 2) for the operation of the host in the embodiment 2.

FIG. 29 is a flowchart (part 2) for the operation of the host in the embodiment 2.

Since processes of steps S141 to S152 are substantially the same as those of steps S41 to S52 in the embodiment 1, their description is omitted here. The operation of the host which is used in the print system in the embodiment 2 will be described hereinbelow in order of steps S153 to S160.

Step S153:
If the compression data to be transmitted to the printer 11-*b* (FIG. 24) is the data of one page, the host 21-*a* (FIG. 24) advances directly to step S155. In the other cases, step S154 follows.

Step S154:
The printer status discriminating means 21-*a*2-1 counts the accumulated number of reception possible notifications.

Step S155:
The host 21-*a* (FIG. 24) transmits the compression data to the printer 11-*b* (FIG. 24).

Step S156:
The driver 21-*a*2 (FIG. 24) repeats the processes of steps S155 and S156 until the transmission of the compression data of the band unit is finished. When the transmission of the band unit is finished, the processing routine advances to step S157.

Step S157:
If the subsequent compression data exists, the driver 21-*a*2 (FIG. 24) continues to repeat the processes of steps S155 to S17 and transmits all compression data to the printer 11-*b* (FIG. 24), and the processing routine advances to step S158.

Step S158:
The host 21-*a* (FIG. 24) waits for the reception possible notification from the printer 11-*b*. If there is no reception possible notification, the processing routine advances to step S160. If the reception possible notification is received, step S159 follows.

Step S19:
The printer status discriminating means 21-*a*2-1 (FIG. 24) counts the accumulated number of reception possible notifications.

Step S160:
The host 21-*a* waits for a print end notification from the printer 11-*b* (FIG. 24). After the print end notification is received, the data transmission is finished.

The operation of the host at the time of the jam recovery in the embodiment 2 will now be described.

FIG. 30 is a flowchart for the operation of the host at the time of jam recovery in the embodiment 2.

When the CPU 11-*b*1-1 (FIG. 24) notifies the host 21-*a* (FIG. 24) of the jam occurrence from in step S124 (FIG. 27) mentioned above, this processing flow is started from the timing when the driver 21-*a*2 (FIG. 24) executes the operation for specifying the compression data for the jam recovery that is needed by the printer 11-*b* (FIG. 24) in the jam recovery on the basis of a count result of the printer status discriminating means 21-*a*2-1 (FIG. 24).

Step S161:

When the CPU 11-*b*1-1 (FIG. 24) notifies the host 21-*a* (FIG. 24) of the jam occurrence, the driver 21-*a*2 (FIG. 24) stops the transmitting process of the compression data which is at present being processed. The driver 21-*a*2 (FIG. 24) discriminates the page in which the jam recovery has occurred from the number of the page monitored by the printer status discriminating means 21-*a*2-1 (FIG. 24).

Step S162:

The driver 21-*a*2 (FIG. 24) discriminates the band in which the jam has occurred on the basis of the count result of the printer status discriminating means 21-*a*2-1 (FIG. 24).

Since processes of steps S163 to S173 are substantially the same as those of steps S62 to S72 in the embodiment 1, their description is omitted here.

That is, the band in which the jam has occurred is specified in steps S161 and S162 mentioned above. After that, the compression data for the jam recovery is retransmitted from the host 21-*a* to the printer 11-*b* by the operation similar to that in the embodiment 1 and the processing flow is finished.

Although the embodiment 2 has been limitatively described with respect to the case where each component portion is constructed as an individual block in a manner similar to the embodiment 1, the invention is not limited to this example. That is, all or a part of the component portions can be constructed as a part of functions of the CPU (not shown) provided in the host 11-*a* (FIG. 24) or the CPU 11-*b*1-1 provided for the controller unit 11-*b*1.

As described above, in the print system of the embodiment 2, since the printer status discriminating means which counts the number of transmission-completed pages and the reception possible notification is provided, by merely notifying the host of only the jam occurrence from the printer, the host can specify the compression data necessary for the jam recovery and transmit it again. Therefore, such an effect that the jam recovery can be easily performed is obtained.

Although the invention has limitatively been described above with respect to the printer, the invention is not limited to such an example but can be also applied to, for example, a copying apparatus or a facsimile apparatus.

The present invention is not limited to the foregoing embodiments but many modifications and variations are possible within the spirit and scope of the appended claims of the invention.

What is claimed is:

1. An image forming apparatus comprising:
   a receiving section which sequentially receives band data that is formed by dividing image data of a page of data into a plurality of bands, said receiving section storing the plurality of received bands as a plurality of band data units in a band storing area,
   a printing section which performs a printing process with respect to individual ones of the plurality of stored band data units, said printing section sending an end notice when the printing process for each one of the plurality of band data units is completed;
   a memory managing section which manages said stored band data units, and on the basis of receiving the end notice sent from said printing section, opens a portion of the band storing area corresponding to one or more band data units whose printing process is completed in order to prepare for subsequent reception of band data; and
   a control section which controls reception of the band data according to said memory managing section;
   wherein if a paper jam occurs during the printing of one of the plurality of band data units, said control section makes said printing section stop printing the page, inquires of said memory managing section which of said band data units have been opened, and requests to re-send only the one or more previously opened band data units corresponding to the page.

2. The apparatus of claim 1, wherein the re-transmitted band data is stored in the band storage area which corresponds to the band data which was received by the printing section prior to the jam.

3. The apparatus of claim 1, further including a management table which stores page information corresponding to each at least one page and band information corresponding to each at least one page.

4. The apparatus of claim 1, wherein the request to re-send the un-stored band data includes a page number and a band number for each band to be resent.

5. The apparatus of claim 1, wherein after the printing process of the band data in the band storage area is completed, the storing section opens the band storage area and receives band data of a next page in order to store it into the opened band storage area.

6. The apparatus of claim 5, wherein after the jam has been eliminated, the control section detects whether or not remainder band data that is not used in the printing process before the error occurred exists in the band data storage area.

7. The apparatus of claim 6, wherein the control section requests to re-send only the band data that was read out from the band storing section before the jam occurred and that is used in the printing process.

8. A printing system comprising:
   an image forming apparatus which sequentially receives band data that are obtained by dividing image data of a page into a plurality of band data units and sends an end notice when a printing process for each received band data unit is completed, sends a notice of occurrence of a jam when a jam is detected and a notice of release of the jam when the jam is released, and
   a host apparatus which sends said image data divided into the plurality of band data units to said image forming apparatus,
   wherein said image forming apparatus comprises a memory managing section which, after a printing process for each one of the plurality of band data units is completed, opens memory of a band data area where the band data unit whose printing process is completed is stored;
   wherein said host apparatus comprises:
   a transmitting section which transmits the plurality of band data units to said image forming apparatus;
   a managing section which receives said notices from said image forming apparatus and manages each band data unit; and
   a control section which controls transmission and reception of each band data unit according to said managing section;
   wherein, upon the control section receiving the notice of a jam occurrence also receives a page number and a band number of the band data unit of each band data memory area that has been opened and re-sends only band data to said image forming apparatus corresponding to each opened band area to be stored in a respective opened band data area.

* * * * *